United States Patent [19]

Doi

[11] Patent Number: 5,432,947
[45] Date of Patent: Jul. 11, 1995

[54] POWER CONTROL TECHNIQUE FOR A COMPUTER SYSTEM TO PROVIDE ADJUSTABLE STORAGE AND NON-STORAGE ACCESS TIMES AND AN ADJUSTABLE PROCESSOR IDLE TIME

[75] Inventor: Katsuo Doi, Sakurai, Japan

[73] Assignee: Sharp Kabushiki Kaisha, Osaka, Japan

[21] Appl. No.: 66,303

[22] Filed: May 21, 1993

[30] Foreign Application Priority Data

May 22, 1992 [JP] Japan .................................. 4-130807

[51] Int. Cl.$^6$ .............................................. G06F 13/10
[52] U.S. Cl. ..................................... 395/750; 395/550; 395/650
[58] Field of Search ........................ 395/750, 550, 650

[56] References Cited

U.S. PATENT DOCUMENTS

| | | | |
|---|---|---|---|
| 4,615,005 | 9/1986 | Maejima et al. | 395/550 |
| 4,758,945 | 7/1988 | Remedi | 395/750 |
| 5,083,266 | 1/1992 | Wantanabe | 395/275 |
| 5,086,387 | 2/1992 | Arroyo | 395/550 |
| 5,167,024 | 11/1992 | Smith et al. | 395/375 |

FOREIGN PATENT DOCUMENTS 3-14111  1/1991  Japan .

OTHER PUBLICATIONS

Newark Electronics, Catalog 113, 1994, p. 94.

*Primary Examiner*—Jack B. Harvey
*Assistant Examiner*—Paul R. Myers
*Attorney, Agent, or Firm*—David G. Conlin

[57] ABSTRACT

A power control apparatus having a plurality of external devices and adapted to be used for a computer system and to reduce the power consumption in an idle state, the apparatus includes a processing unit for receiving a signal from at least one of the plurality of external devices and for outputting an instruction according to the received signal, a storage unit connected to the processing unit for temporary storing information and for accessing to the processing unit according to the instruction output from the processing unit, an interface unit connected to both the processing unit and the storage unit for controlling an interface between the processing unit and the storage unit, and an adjusting unit connected to the interface unit for adjusting a time proportion of an access cycle to a non-storage unit, for adjusting a time proportion in an operation of the processing unit to be stopped, and for adjusting an access to the storage unit.

13 Claims, 18 Drawing Sheets

POWER CONTROL TECHNIQUE FOR A COMPUTER SYSTEM TO PROVIDE ADJUSTABLE STORAGE AND NON-STORAGE ACCESS TIMES AND AN ADJUSTABLE PROCESSOR IDLE TIME

BACKGROUND OF THE INVENTION

1. Field of the Invention

The present invention relates to a power control apparatus for a computer system which may adaptively apply to office automation equipment.

2. Description of the Related Art

The inventors of the present application know a representative computer system which is arranged as follows. This computer system is arranged to have a microprocessor (such as CPU), a data cache memory, an instruction cache memory, a bus interface, a random access memory (RAM), a read-only memory (ROM) and various I/O units.

The microprocessor, the bus interface, the data cache memory and the instruction cache memory may be integrated on one chip or more than one chips.

The above mentioned computer system is actually implemented in some computers such as R3000 manufactured by the MIPS Computer Systems, INC. in USA (for example, see "MIPS SET Technical Manual" published by the LSI Logic Inc., Order No. 63004, Part No. MM71-000101-99A).

The microprocessor (CPU) designed by the MIPS Computer Systems is grouped as a RISC (Reduced Instruction Set Computer). This computer achieves a fast processing speed, because it can access the instruction or data at one machine cycle if it is stored in a cache memory. Normally, the CPU checks if the instruction or data is stored in the cache memory at each machine cycle with the cache bus and continues to access the cache memory for processing if it is stored therein.

Next, consider the flow of pipelines in the microprocessor R3000 having five pipeline stages.

The microprocessor R3000 includes five pipelines which are executed in a manner to overlap one pipeline with the adjacent pipeline. As such, if the instruction or data exists in the cache memory, one instruction can be processed at one clock cycle. The five pipelines are a Fetch (IF) stage for fetching an instruction from the cache memory, a register decode (RD) stage, an arithmetic logic unit (ALU) stage, a memory access (MEM) stage, a write back (WB) stage for writing back the data to the register, respectively.

Then, the description will be oriented to a way of which the microprocessor R3000 operates if no hit takes place in the instruction cache.

The instruction to be executed by the microprocessor (CPU) is located in the RAM for the first time. The CPU serves to read out the instruction from the cache memory for executing an instruction. Since the instruction is located in the RAM, a miss hit takes place in the cache memory.

Next, the CPU enters into a stall cycle for reading the instruction from the RAM through the bus interface. Then, the CPU accesses the RAM through the bus interface and writes the read instruction in the cache memory (at a fix-up cycle). The CPU fetches the instruction from the cache memory and starts to run again.

In general, the microprocessor (CPU) provides a highly localized program, that is, although the instruction is read by the cache memory once, it may be very frequently used again. If the instruction exists (referred to "is hit") in the cache memory, the operation flows smoothly through the five pipelines so that the microprocessor can read the instruction and continues to run at one access cycle by an effective one instruction. Hence, the microprocessor makes use of the following relation when it is in operation.

Access Time for RAM > Access Cycle Time for Cache Memory

The foregoing description holds true to an operation of accessing the cache for data. Further, the foregoing description has concerned with accessing the RAM if a miss hit on the cache takes place. In place, consider that the microprocessor accesses the I/O unit or the ROM connected on the system bus. For accessing these units, the microprocessor uses a logic address space without using the cache memory. As such, like the case of the miss hit on the cache memory, the stall cycle is needed.

If no hit on the cache memory takes place (a "miss hit") at the MEM stage, another stall cycle for accessing the RAM takes place so that the MEM stage of the next instruction will be set in the waiting state.

From a quantitative point of view, assuming that the access to the RAM consumes N-1 cycles, the instruction is written in the cache memory before the microprocessor restarts to run, and let the probability of hitting the cache memory to be A %, then the number of average cycles required for executing one instruction is given by the following relation:

$$1 \times A/100 + N \times (1 - A/100)$$

For example, if A=98% and N=4 cycles, this formula can be calculated as:

$$1 \times 98/100 + 4 \times (1 - 98/100) = 1.06$$

In this case, the number of average cycles needed for executing an instruction comes closer to 1. The effective processing speed of the CPU comes closer to the clock cycle of the CPU. It means that the processing speed is substantially maintained.

This is the principle in which the computer system provided with a cache memory operates.

This principle holds true to accessing the cache for reading data, that is, the computer system executes to read an instruction from the cache memory and to read or write data as frequently as the machine cycle on which the computer system depends.

If the current execution process stays in the waiting state for an I/O and no execution process is left in the computer system, this state is referred to as an idle state in which the computer system is controlled to execute an idle loop or execute a stop instruction so that the interrupt of the I/O unit may get the computer system itself out of the idle state.

The inventors of the present applicant know the following method of causing an idle state.

As the simplest idle state, (1) the idle loop is executed until the interrupt from the I/O unit takes place. In this method, no significant process is executed in the idle state. However, such an idle state often takes place when waiting for an interrupt from the I/O unit. Hence, to conserve the power consumption in this state, some methods have been considered.

For example, in the CPU of MC68000 manufactured by Motorola Inc., a stop instruction for stopping an operation of the CPU is prepared in the instruction set. This stop instruction is used, that is, (2) the instruction for stopping the CPU in the idle state is executed for putting the CPU into the stopping state and then the CPU enters into the state of waiting for an interrupt from an I/O unit.

If an interrupt from an I/O unit takes place, the CPU returns from the stopping state.

If the microprocessor is manufactured by CMOS (Complementary Metal Oxide Silicon), it may use a proportional relation between power consumption and clock frequency for lowering the clock frequency.

If the microprocessor is a RISC CPU such as SPARC CPU CY7C601 manufactured by CYPRESS Company, it makes use of the fact that nothing unfavorable takes place if the CPU clock is stopped, that is, (3) to cause an idle state, the microprocessor accesses the I/O unit for stopping the CPU clock and if an interrupt from an I/O unit takes place, the CPU clock is restarted.

Such a function needs another circuit for controlling a CPU clock in addition to the CPU. Further, as a transformation of the method (3), the clock frequency may be lowered without making the CPU clock zero. Since the CPU or the cache memory manufactured in the recent CMOS process increases a power consumption proportional to the operating frequency, the method (3) including its transformation makes it possible to lower the power consumption.

As a combination of these methods, in the Japanese Patent Application Lying Open No. 3-14111, "Power-saving Control Unit for Microprocessor", a method for both issuing a CPU-stopping instruction and stopping a CPU clock at the same time, is disclosed.

In the above mentioned method (1), the overall idling loop is loaded in each cache memory, because the number of instructions for an idling loop is small. As a result, the idling loop is executed at a speed of one instruction/one clock. The operation of the CPU/Cache memory fully depends on the operating speed of the CPU clock. Hence, the power consumption of the computer system is mainly for the CPU and the cache memory, and this leads to disability to reduce the power consumption for idling.

The above mentioned method (2) has a shortcoming that it cannot be adapted to the CPU providing no CPU-stopping instruction. In actual, the commercially available CPUs normally provide such an instruction, hence this method has a low feasibility.

The above mentioned method (3) has a shortcoming that if the CPU does not employ a static design, the CPU clock is not made zero or lowered. In actual, the commercially available CPUs normally do not provide such a static design. Further, in the most of the CPUs, the CPU clock is equal to the system bus clock or a multiple of the system bus clock. In such systems, the CPU clock is disallowed to be changed.

SUMMARY OF THE INVENTION

It is an object of the present invention to provide a power control apparatus adapted to be used for a computer system and to reduce the power consumption in an idle state independently of the CPU clock.

The object of the present invention can be achieved by a power control apparatus having a plurality of external devices and adapted to be used for a computer system and to reduce the power consumption in an idle state, includes a processing unit for receiving a signal from at least one of the plurality of external devices and for outputting an instruction according to the received signal, a storage unit connected to the processing unit for temporary storing information and for accessing to the processing unit according to the instruction output from the processing unit, an interface unit connected to both the processing unit and the storage unit for controlling an interface between the processing unit and the storage unit, and an adjusting unit connected to the interface unit for adjusting a time proportion of an access cycle to a non-storage unit, for adjusting a time proportion in an operation of the processing unit to be stopped, and for adjusting an access to the storage unit.

The adjusting unit is so arranged that all of the adjusting processes are executed in an idle state of waiting an interrupt for terminating a process from another one of the plurality of external devices.

The plurality of external devices includes an input/output device, a main memory, a read-only memory, and at least two peripheral devices.

The adjusting unit includes an acknowledge generating circuit connected to the interface unit for generating an acknowledge signal during a predetermined time period so as to terminate an access cycle of one of the peripheral devices according to the acknowledge signal generated.

The adjusting unit further includes an address decoder connected to the acknowledge generating circuit for outputting a select signal to the read-only memory, and the acknowledge generating circuit generates an acknowledge signal after a passage of selecting time of the read-only memory so that an access cycle of the read-only memory is terminated according to the acknowledge signal generated.

The adjusting unit includes a virtual input/output control unit connected to the interface unit for extending a stall cycle indefinitely so as to reduce a power consumption into a minimum.

The virtual input/output control unit is further adapted to access the storage unit for reading data so that the processing unit sets an operating state into the stall cycle in the idle state.

The adjusting unit further includes a virtual input/output address decoder connected to the virtual input/output control unit for sensing an access to the virtual input/output control unit so that the virtual input/output control unit sends a select signal to the virtual input/output control unit.

The virtual input/output control unit is adapted to extend an access cycle without generating an acknowledge signal until an interrupt from the one of peripheral device takes place in the access cycle, generate an acknowledge signal, and send the generated acknowledge signal to the interface unit so as to terminate the stall cycle.

The adjusting unit further includes an interrupt control unit connected to both the processing unit and the virtual input/output control unit for executing a logic OR of interrupts output from the peripheral devices so as to output an interrupt signal to the virtual input/output control unit.

The adjusting unit includes a bus buffer connected to both the interface unit and the virtual input/output control unit and adapted to be disabled when a signal is asserted thereto from the virtual address decoder so as to lower a power consumption.

The adjusting unit further includes an external bus buffer connected to the virtual input/output control unit and adapted to be disabled when a signal is asserted thereto from the virtual address decoder so as to lower a power consumption.

The power control apparatus further includes a first system bus for interconnecting the interface unit with the bus buffer and the virtual address decoder, a second system bus for interconnecting the bus buffer with the external bus buffer, the peripheral devices, the main memory and the read-only memory.

The adjusting unit further includes a power consumption reducing unit connected to the virtual input/output control unit and adapted to supply voltages to any devices located on the first system bus and the second system bus with a low power consumption state.

The processing unit is a microprocessor, the storage unit is a cache memory, the interface unit is a bus interface.

In operation, the power control apparatus for a computer system according to the invention operates to control the microprocessor and the cache memory through the bus interface. The adjusting unit operates to adjust a proportion on time of a non-cache memory access cycle in an idle state for waiting for a process-terminating interrupt from an I/O unit. Further, the adjusting unit operates to adjust a proportion on time of when the microprocessor is stopped and an operation of accessing the cache memory.

As such, the access to the I/O unit is not terminated during an access cycle set to suit to the access time of the I/O unit. The microprocessor having accessed the address is substantially stopped because access to the cache memory and the next instruction of the access to the address of the I/O unit are not allowed to be executed. Hence, during this period, the microprocessor, the cache memory and the bus interface reduce their power consumption. Further, the reduction results in allowing the battery-driven computer system to extend its driving time and suppress heating of the microprocessor and the cache memory, thereby mitigating the requirement for cooling the parts and enhancing the reliability of these parts. Moreover, the microprocessor enables to accept an interrupt and a request for obtaining a system bus immediately when an access cycle for the I/O unit is terminated. Hence, the microprocessor can keep its processing speed.

Further objects and advantages of the present invention will be apparent from the following description of the preferred embodiments of the invention as illustrated in the accompanying drawings.

DESCRIPTION OF THE PREFERRED EMBODIMENTS

Referring to the accompanying drawings, a preferred embodiment of a power control apparatus for a computer system according to the present invention will be described in detail.

Figure 1:
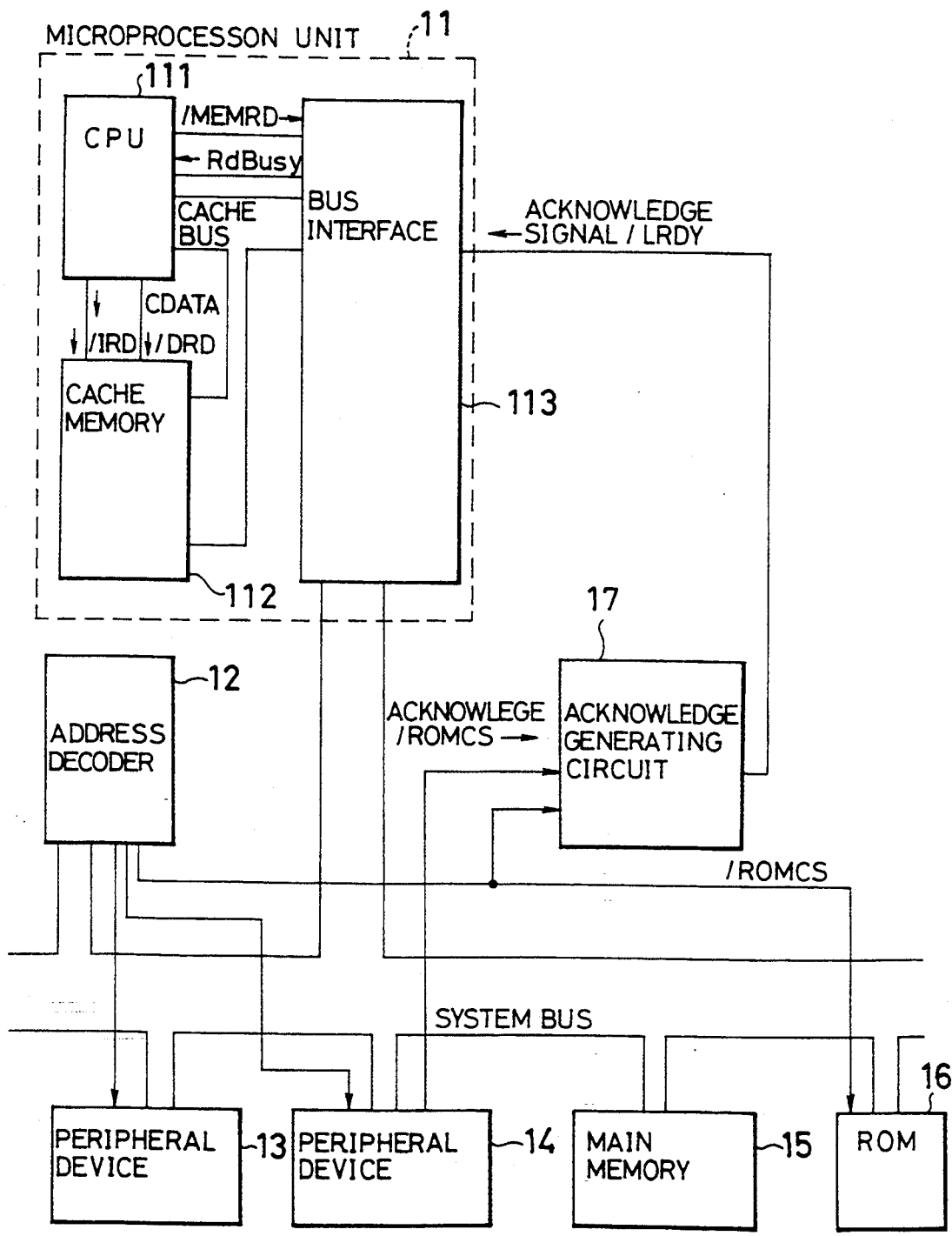
FIG. 1 is a block diagram showing a power control apparatus for a computer system according to a first embodiment of the invention.

FIG. 1 shows a power control apparatus for a computer system according to a first embodiment of the present invention.

As shown in FIG. 1, the power control apparatus for a computer system is arranged to have a microprocessor unit 11, an address decoder 12, a first peripheral unit 18, a second peripheral unit 14 for issuing an acknowledge signal, a main memory 15, a read-only memory (ROM) 16, and an acknowledge signal generating circuit 17.

The microprocessor unit 11 includes a microprocessor (CPU) 111, a cache memory 112, and a bus interface 113.

Next, the operation of each part will be described.

Figure 2:
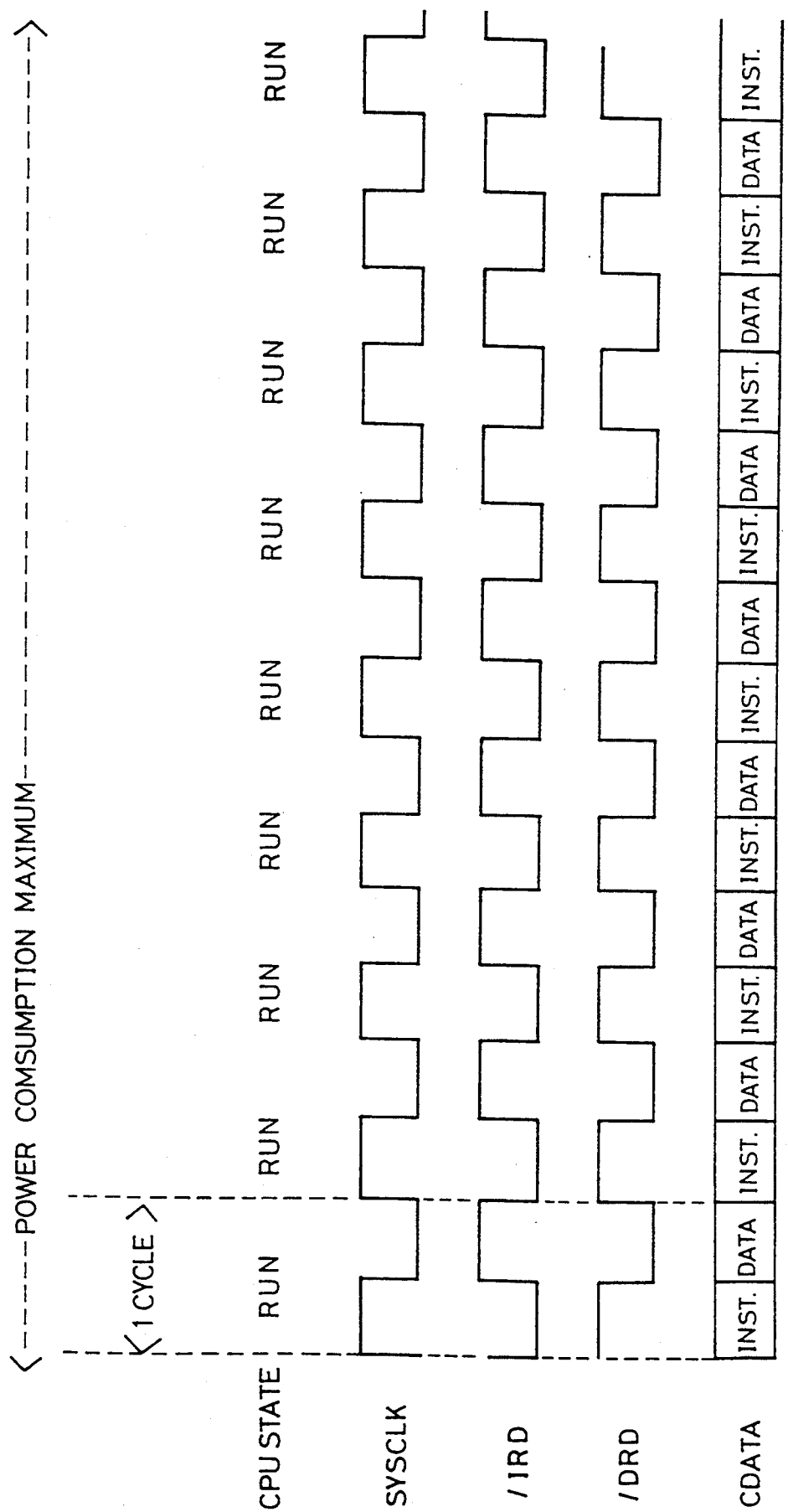
FIG. 2 is a flowchart for explaining an operation of the power control apparatus shown in FIG. 1 if a cache memory is fully (100%) hit.
Figure 3:
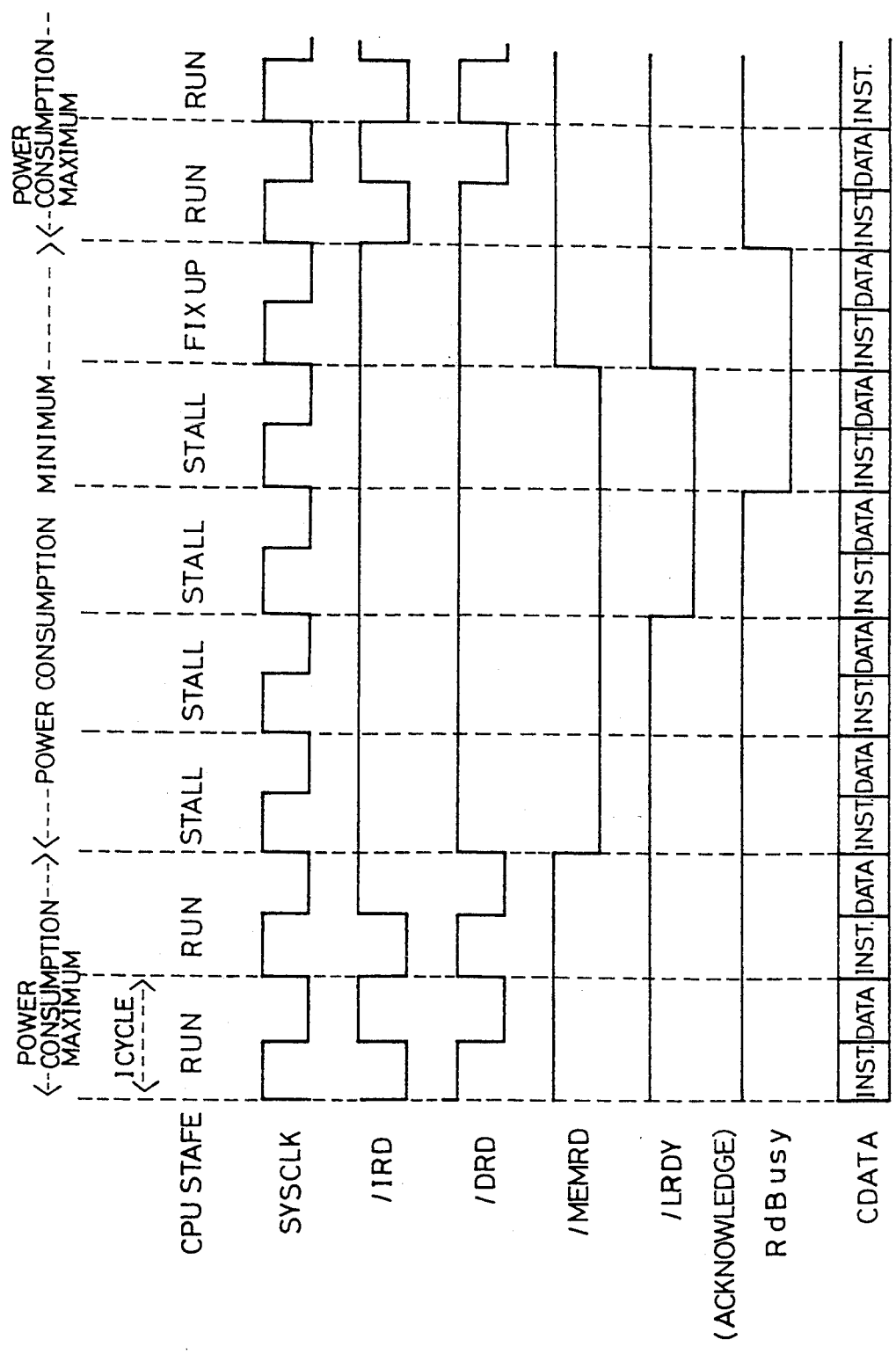
FIG. 3 is a flowchart for explaining an accessing operation for a system bus in the power control apparatus shown in FIG. 1 if a miss hit on a cache memory for data takes place.

The microprocessor unit 11 is arranged to operate in synchronous to a system clock SYSCLK of the CPU 111 as shown in the timing charts of FIGS. 2 and 3. In order to read an instruction, the CPU 111 accesses the cache memory 112.

When executing the process, the system clock appears as shown in FIG. 2 if the cache memory 112 is Fully hit, that is, a cache read strobe/IRD from the instruction cache memory is asserted in the first half of the cycle so as to start accessing an instruction. In the second half of the cycle, a cache read strobe/DRD is asserted for reading data. As such, the microprocessor 111 can access the cache data bus shown in FIG. 1 for an instruction and data alternately in each half cycle.

The microprocessor (CPU) 111 executes the processing at the same cycle as the system clock SYSCLK. At this time, the microprocessor needs a maximum power consumption.

In order to access a peripheral device such as a peripheral device 13 or a ROM 16 providing a fixed access cycle, the acknowledge signal generating circuit 17 generates an acknowledge signal for a certain period of time for terminating the access cycle. The acknowledge signal issued by the peripheral device 14 having a capability of creating an acknowledge signal is ORed with another acknowledge signal in the acknowledge signal generating circuit 17 and then the resulting signal is sent back to the bus interface as an acknowledge signal.

FIG. 3 shows a routine for accessing the system bus when a miss hit on the cache for reading data takes place.

If the miss hit on the data cache takes place at the second cycle, /MEMRD (see FIG. 1) is asserted to the bus interface at the third cycle from which the CPU 111 starts to access the system bus.

From the system bus, the acknowledge signal/LRDY is asserted to the bus interface 113 for a certain period of time. This causes a RdBusy signal to the CPU 111 to be negated. This results in terminating the access cycle for the system bus.

At the fix-up cycle, the CPU 111 reads the data read from the system bus and restarts the executing state at the next cycle.

Focusing on the power consumption, when the CPU 111 is in the executing state, the power consumption is maximum. At the stall cycle, the access to the cache memory 112 is stopped at each cycle. Hence, the power consumption in the cache memory 112 is small. The CPU 111 also stops executing an instruction. As a consequence, the power consumption in the CPU 111 is made lower. That is, in the computer system arranged to have a cache memory 112 with a large volume and a faster access cycle than the system bus, the power consumption has the corresponding value for each stage indicated as follows.

Power Consumption (Pmax) at the cache hit>>- Power Consumption (Pmin) at the stall cycle (when accessing the system bus)      (1)

The power consumption at the stall cycle is slightly variable according to a device to be accessed. If the device such as the ROM 16 shown in FIG. 1 is selected, the power consumption at a time when a cache hit takes place is considerably small.

As a recent technical trend, more computer systems are arranged so that the microprocessor unit 11 (see FIG. 1) operates on a different clock from the system bus and the operating clock of the microprocessor unit 11 is set as a high frequency for enhancing the performance. As is indicated in the inequality relation of (1), the power consumption Pmax when a cache hit takes place is made maximum.

If the microprocessor (CPU) 111 has no process left to be executed and is waiting for an interrupt from an I/O unit, according to this embodiment, the microprocessor 111 serves to access the ROM 18 from which the process is allowed to be read in the state and repeat the process in a loop manner so that the stall cycle may be frequently executed, that is, the ROM 16 is used as a power-saving I/O unit.

If no process to be executed by the system is left (for example, the system waits for any key input), the state is referred to as an idle state. When the system enters into the idle state, the system operates to read the ROM 16 and enters into the stall cycle.

The address decoder 12 shown in FIG. 1 sends a select signal ROMCS to the ROM 16 with the memory-mapped I/O, to/from the system bus. In response to the select signal, the acknowledge generating circuit 17 generates an acknowledge signal (/LRDY) after passage of the ROM-selecting time and then the ROM access cycle is terminated (see FIG. 4).

When the stall cycle is terminated and then the CPU 111 enters into the run state, the necessary power consumption becomes maximum. At the fix-up cycle, the data read into the CPU 111 is the data stored in the ROM 16.

The device having its own acknowledge signal such as the peripheral device 14 is connected to the bus interface 113 in a manner to take a logic OR of the acknowledge signal and the acknowledge signal generated by the acknowledge signal generating unit 17. This connecting arrangement makes it possible to eliminate the adverse effect on the access cycle of the peripheral device which controls its access cycle with its own acknowledge signal.

Figure 4:
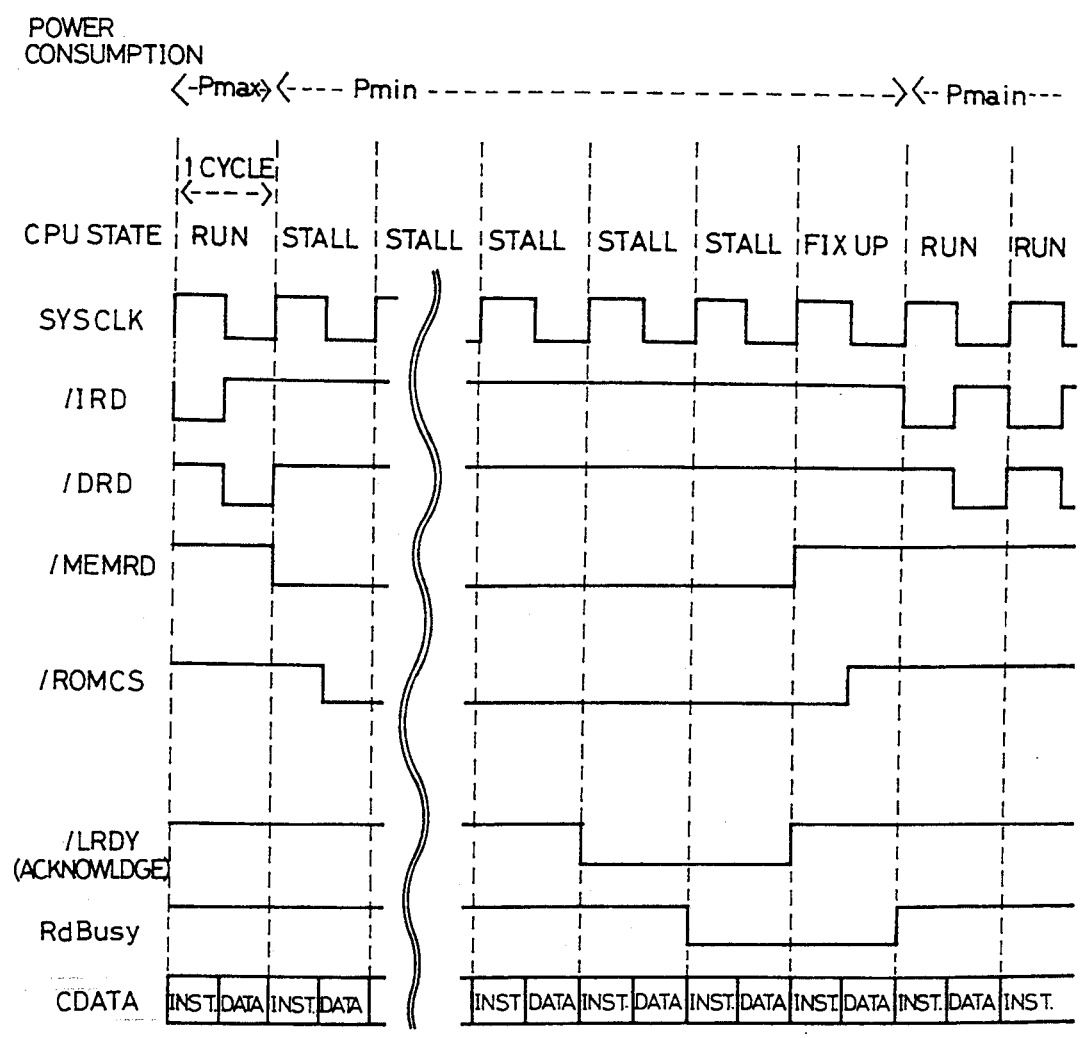
FIG. 4 is a timing chart for explaining an access cycle for a ROM.
Figure 5:
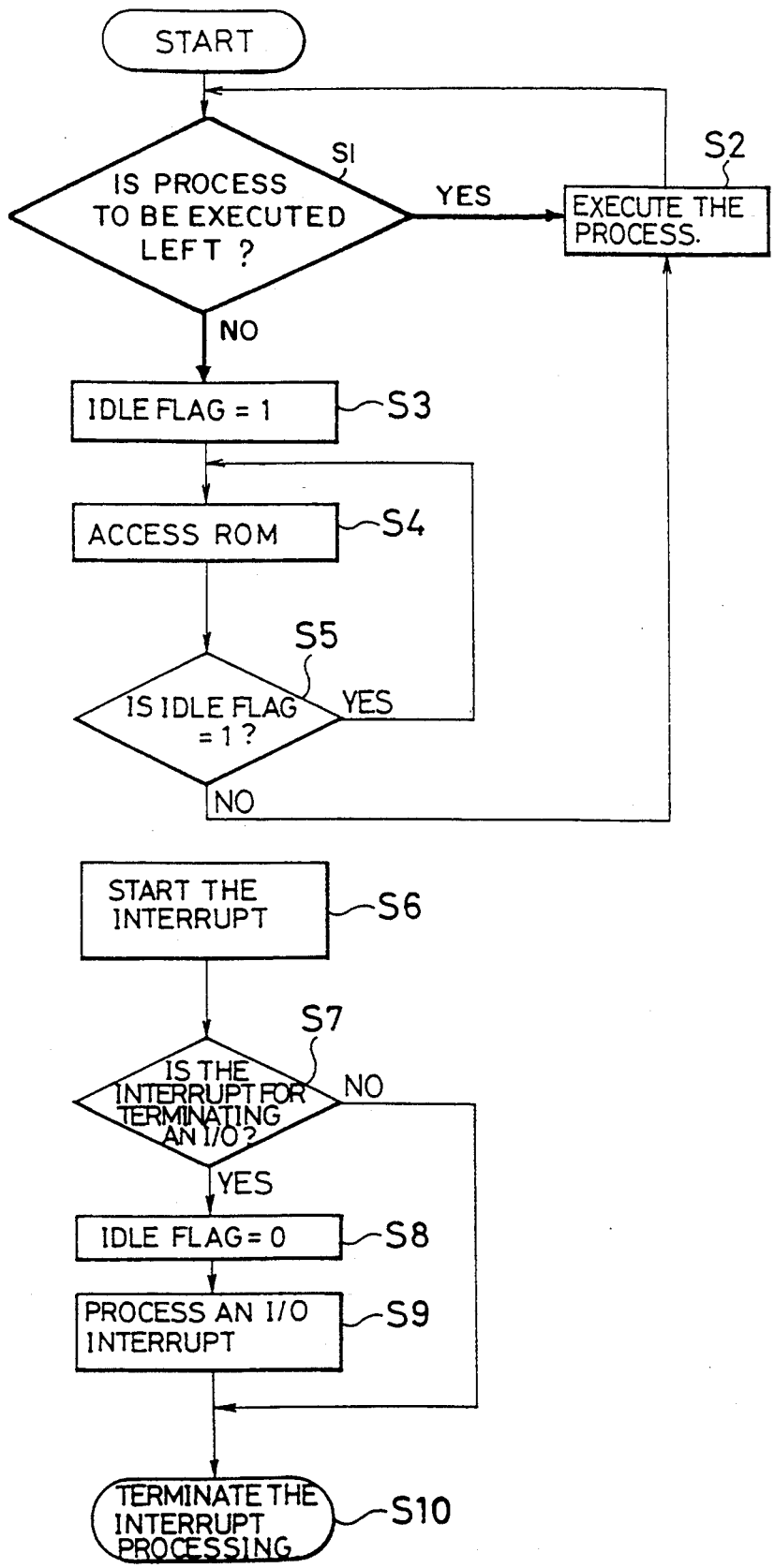
FIG. 5 is a flowchart showing a routine for accessing the ROM 16 in the idle state.

Next, each step shown in FIG. 5 will be described by referring to FIG. 4.

At first, it is determined whether or not the process to be executed is left (step S1). If yes, the process is executed (step S2) and then the operation returns to the start.

If no at the step S1, a variable "idle flag" secured in the main memory 15 shown in FIG. 1 is set to 1 (step Then, the operation is executed to read the ROM 16 (step S4).

The CPU 111 enters into the stall cycle at which the power consumption is made lower.

In succession, after accessing the ROM, it is determined whether or not the idle flag is 1 (step S5). If it is 1, the operation returns to the step S4 at which the operation of accessing the ROM is repeated.

If, at the step S5, the idle flag is not 1, the operation returns to the step S2 at which the process is executed.

If an interrupt is entered while the process is executed, it is checked if the I/O to or from the peripheral device is terminated (step S7). If, at the step S7, the I/O is terminated, the "idle flag" is cleared as 0 (step S8). The interrupt to the I/O is executed (step S9). Then, the interrupt is terminated (step S10) and the operation is also terminated.

The foregoing algorithm is used for reducing the power consumption by using the ROM accessing operation in the idle state. Since the control program is small in size, the cache memory 112 could load the control program. However, the ROM accessing loop is arranged to execute an instruction on the cache memory 112 and repeat a long ROM accessing cycle. Hence, the stall cycle for accessing the ROM occupies a large time proportional to the overall cycle.

According to this embodiment, the ROM accessing cycle is made up of 34 cycles, while the instruction composing an idle loop is made up of a few machine cycles.

The part of the idle loop in the algorithm shown in FIG. 5 may be represented as follows in the C language.

```
idleflag = 1 ; /* set an idle flag */
while (idleflag)   {/* if an idle flag is not set to 0, the
                    loop is executed */ temp = *romadr; /*
                    read ROM */}
```

That is, the address of the ROM 18 is stored as a variable of romadr and for a temporary variable of temp, a reading loop is produced.

By serially describing the ROM reading operation, a proportion on time of executing the instruction for loop control is reduced, resulting in increasing the time proportion of the stall cycle as follows for enhancing the effect.

```
idleflag = 1 ; /* set an idle flag */
while (idleflag)      {/* if an idle flag is not set to 0, the
                       loop is executed */
                       temp = *romadr; /* read ROM */
                       temp = *romadr; /* read ROM */
                       temp = *romadr; /* read ROM */
                       temp = *romadr; /* read ROM */
                       temp = *romadr; /* read ROM */
                       temp = *romadr; /* read ROM */
                       temp = *romadr; /* read ROM */
                       temp = *romadr; /* read ROM */}
```

The ROM 16 shown in FIG. 1 is not accessed through the system bus if it is cached. Hence, the address of the ROM 16 is allocated to the logic address which is not cached in the physical address space.

The arrangement of the physical address space according to this embodiment is listed in Table 1.

TABLE 1

Physical Address Map

| Physical Address | Way of Use | Cycle Control System |
|---|---|---|
| 0 x00000000-0x0FFFFFFF | Main Memory Area | Acknowledge |
| 0 x1FB00000-0x1FBDFFFF | Second I/O Area | Fixed Time |
| 0 x1FBE0000-0x1FBEFFFF | First I/O Area | Acknowledge |
| 0 x1FBF0000-0x1FBFFFFF | Internal I/O of Bus Interface Chip | — |
| 0 x1FC00000-0x1FFFFFFF | ROM Area | Fixed Time |
| 0 x1FFFFFFF-0xFFFFFFFF | Non-used Area | |

The I/O area is divided into the first and the second areas. The first I/O area is allocated to the peripheral device 14 arranged to control the cycle time with an acknowledge signal. The second I/O area is allocated to the I/O unit in which the access time is fixed, that is, the access cycle is truncated after a certain time is passed. Hence each address space has the corresponding control system for the system bus.

According to this embodiment, R3000 manufactured by the MIPS, Inc. is used as the CPU 111. Therefore, in case that the ROM 16 allocated to the physical address 0x1FC00000 is accessed from the logic address 0xBFC000000, the ROM 16 is not cached but the access to the system bus takes place. This is based on the specification of R3000. Any CPU may have an allocated logic address space which is not cached for an I/O unit. As such, the ROM may be allocated to the proper area.

Table 2 lists the result of reducing the power consumption in case that this embodiment applies to the computer system.

TABLE 2

Effect for Reducing Power Consumption of CPU Board

| | CPU Utilization 0% | CPU Using Rate 100% |
|---|---|---|
| Previous OS (1) | 26.5 W | 26.5 W |
| Present OS (2) | 21,0 W | 26.5 W |
| (2) - (1) | 5,5 W | 0.0 W |

In this embodiment, the CPU 111 is R3000A, the coprocessor of the CPU 111 is FPU R3010A (Floating Point Operating Chip), the cache memory 112 is IDT7MB6049 (64 KB instruction cache plus 64 KB instruction cache) manufactured by IDT, Inc., the bus interface 113 is LR3202 manufactured by LSI Logic, Inc. The main memory has 16 MB volume. Further, the computer system of this embodiment provides a disk, I/O units, and an ethernet interface.

The system clock of the CPU 111 is 25 MHz and the operating system is RISCos V4.51 manufactured by MIPS Computer Systems, Inc., which are produced on the UNIX (AT&T), and an access loop to the ROM 16 is inserted into the part of I/O waiting.

In the time-sharing type OS on which a plurality of processes run like UNIX, an idle state is prepared in a scheduling algorithm for managing execution of the processes in order that the apparatus according to this embodiment may be used in the idle state. For the part of the idle state, the ROM accessing loop is inserted.

The number of parts to be changed is just one, that is, the operating system is changed.

The system employed in the apparatus of this embodiment, as listed in Table 2, provides an effect of reducing the power consumption by 5.5 w. The system further makes contribution to lowering the temperatures of the CPU, the FPU, and the cache memory.

In the foregoing embodiment, one idle loop is arranged to read the ROM 16 sixteen times consecutively.

The utilization of the CPU unit a proportion on time of the CPU being not in the idle state while the system is in operation. The present system enables to reduce the power consumption in the idle state. As such, in principle, the relation between the effect of reducing the power consumption and the CPU utilization is linear, that is, the power consumption is as follows;

Power Consumption at the CPU utilization being 0% = Wmin

Power Consumption at the CPU utilization being 100% = Wmax

Therefore, the following relation is established;

Power consumption = Wmin + (Wmax − Wmin) × CPU utilization (%)/100

Hence, as the CPU utilization is lower, the effect of reducing the power consumption is made higher.

In the UNIX circumstance, the CPU often waits for an interrupt from an I/O unit, thereby, the CPU utilization often approaches to 0%. In this state, the power consumption is substantially equal to Wmin, which means that the apparatus of this embodiment is very effective.

If the apparatus of this embodiment applies to a battery-driven computer system, the computer system can be driven by a battery for a longer time by the reduced amount of the power consumption.

In the idle state, the switching ratio of the cache memory bus to the system bus is made lower. Hence, it is possible to suppress the unnecessary electromagnetic wave occurring in the circuit. Further, it is unnecessary to change the circuit, but it is necessary to change the software in a manner to access the ROM in the idle state.

As the current technical trend, it is required of increasing an operating speed of the CPU, a volume and a speed of the cache memory. Therefore, the present invention is made more effective.

Figure 6:
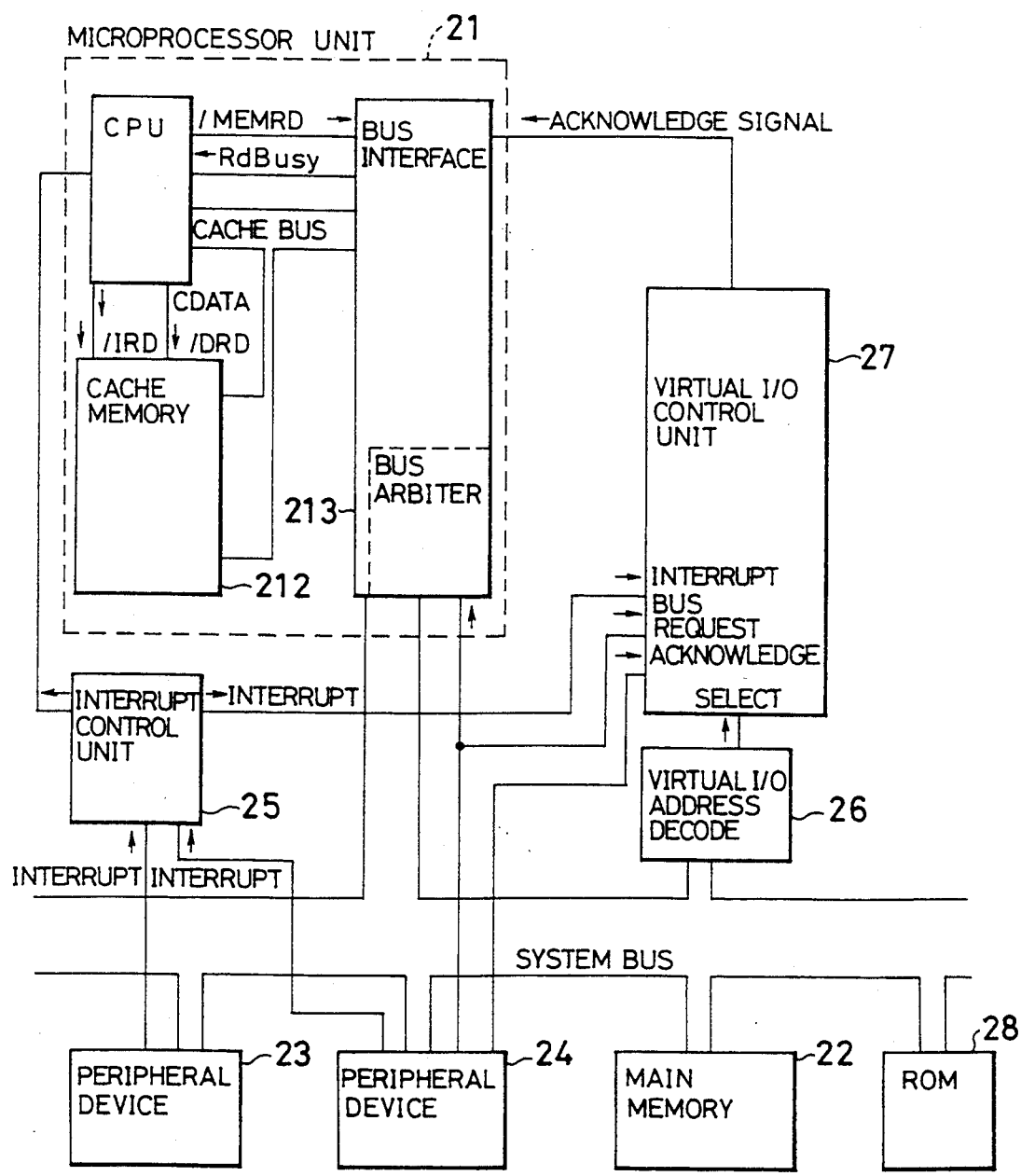
FIG. 6 is a block diagram showing a power control apparatus for a computer system according to a second embodiment of the present invention.

FIG. 6 shows an arrangement of a power control apparatus for a computer system according to a second embodiment of the present invention.

The power control apparatus for a computer system shown in FIG. 6 is arranged to have a microprocessor unit 21, a main memory 22, a third peripheral device 23, a fourth peripheral device 24 for issuing a request to obtain a system bus, an interrupt control unit 25, a virtual I/O address decoder 26, a virtual I/O control unit 27, and a ROM 28.

The microprocessor unit 21 includes a microprocessor (CPU) 211, a cache memory 212, and a bus interface 213. The bus interface 213 has a bus arbiter built therein. The bus arbiter operates to arbitrate a right of obtaining the system bus. The virtual I/O control unit 27 is installed with the I/O address decoder 26, which is assigned to part of an I/O unit of the system as a memory-mapped I/O unit.

Next, the description will be oriented to an operation of the power control apparatus for a computer system shown in FIG. 6.

Figure 8:
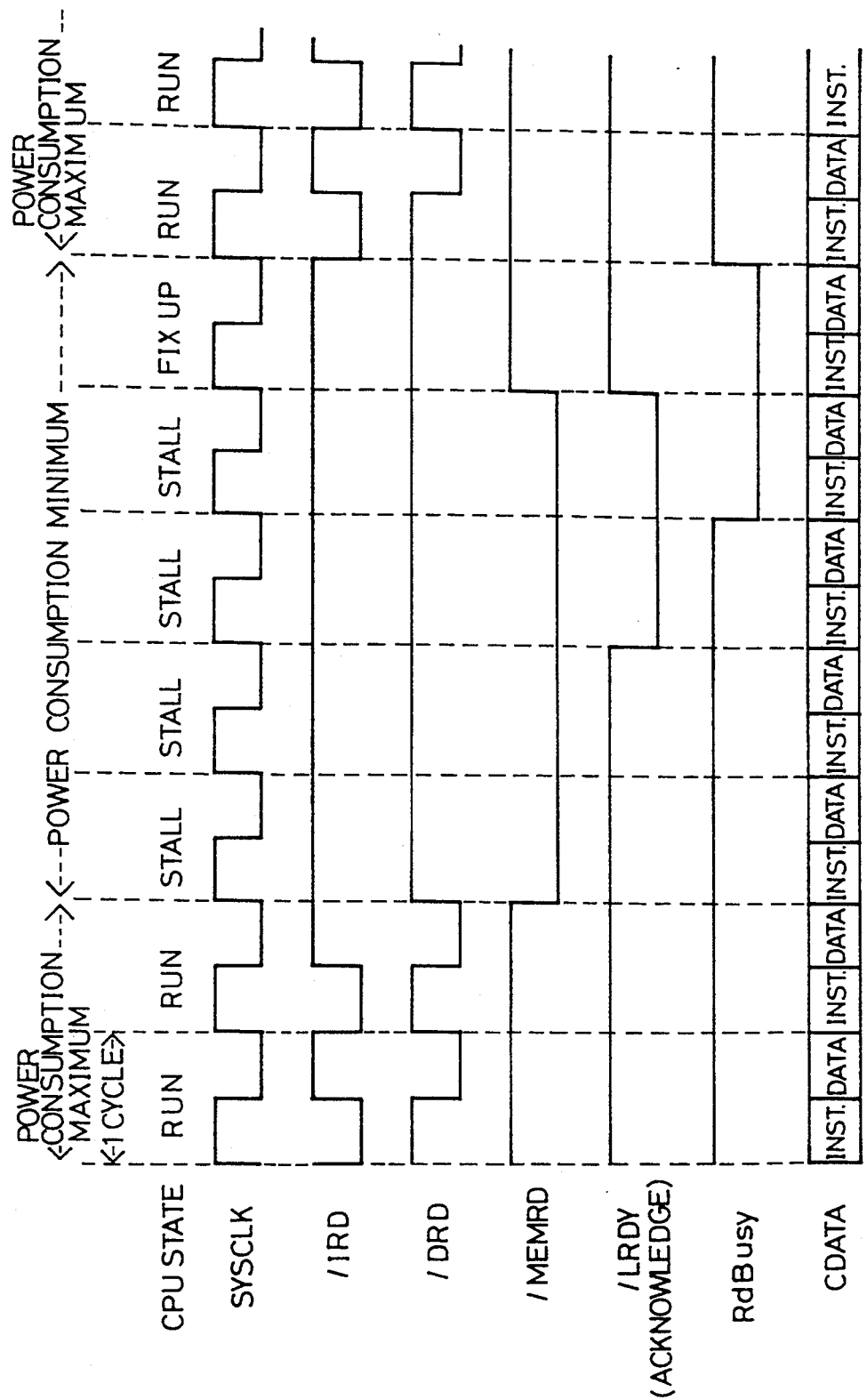
FIG. 8 is a flowchart for explaining an operation of the power control apparatus for a computer system shown in FIG. 6 when accessing a system bus if a miss hit on the cache for data takes place.

The microprocessor unit 21 operates in synchronous to the system clock SYSCLK of the CPU 211 as indicated in the timing chart of FIG. 8. The CPU 211 makes access to the cache memory 212 for reading an instruction from the CPU 211.

Figure 7:
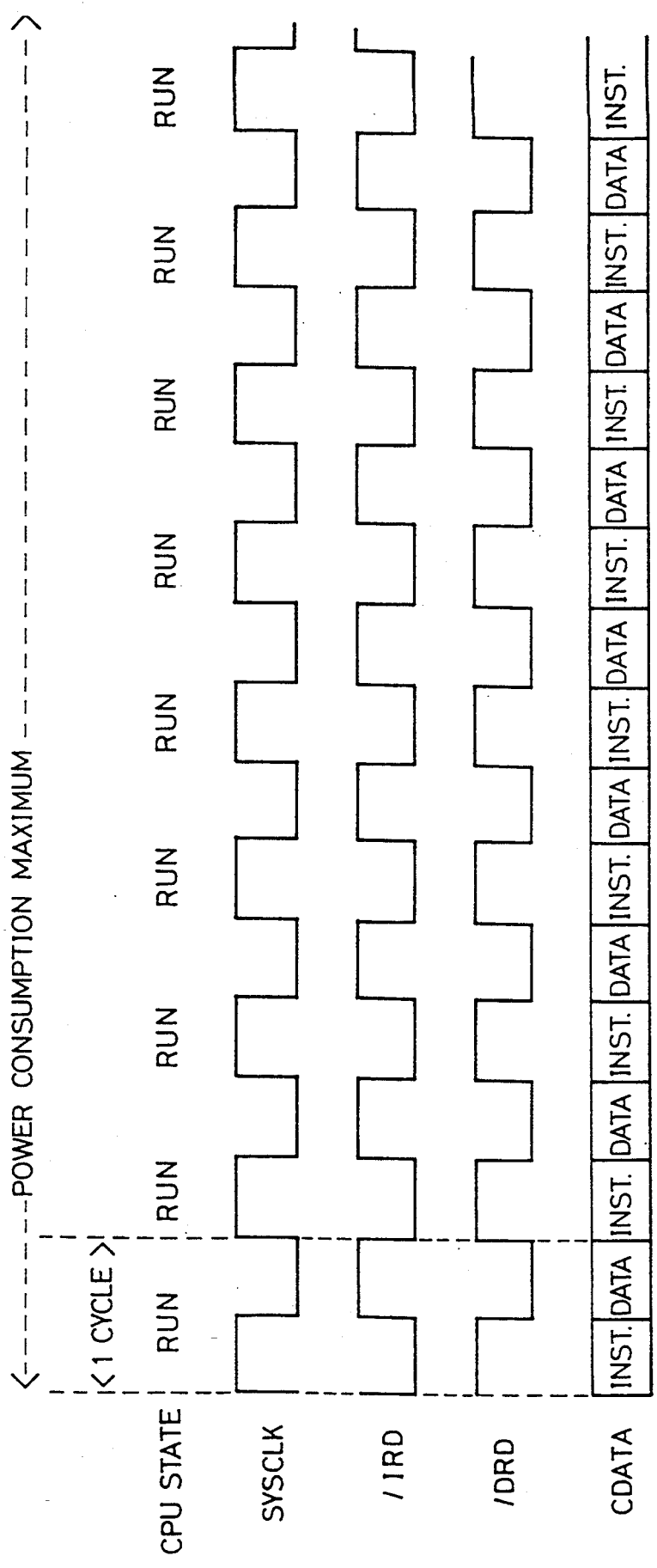
FIG. 7 is a flowchart for explaining an operation of the power control apparatus for a computer system shown in FIG. 6 if a cache is fully hit.

FIG. 7 is a chart showing the timing appearing when a cache is fully (100%) hit in executing the process.

As shown in FIG. 7, the cache read strobe/IRD sent from the instruction cache is asserted in the first half of the cycle so that the CPU 211 can access the cache for reading an instruction. In the second half of the cycle, the cache read strobe/DRD is asserted for reading data from the cache memory. This makes it possible to access the cache data bus shown in FIG. 6 for reading the instruction or the data alternately at each half cycle.

At this time, the microprocessor (CPU) 211 operates on the same cycle as the system clock SYSCLK. Hence, the power consumption is maximum.

FIG. 8 is a chart showing the timing appearing when accessing the system bus if a miss hit on the cache for reading data takes place.

As shown in FIG. 8, if the CPU 211 miss hits the data cache at the second cycle, /MEMRD (see FIG. 6) is asserted to the bus interface 214 at the third cycle so that the access to the system bus is started.

From the system bus, an acknowledge signal/LRDY is asserted to the bus interface 213 after a certain time is passed. This signal allows a RdBusy signal to be negated to the CPU 211, resulting in terminating the access cycle to the system bus.

At the fix-up cycle, the CPU 211 reads the data from the system bus, and the execution state is restarted at the next cycle.

Focusing on the power consumption, when the CPU 211 is in the executing state, the power consumption is maximum. At the stall cycle, the access to the cache memory 212 is stopped at each cycle. Hence, the power consumption in the cache memory 211 is small. The CPU 211 also stops executing an instruction. Hence, the power consumption in the CPU 211 is made lower.

In the computer system arranged to have a cache memory 212 with a large volume and a faster access cycle than the system bus, the power consumption has the corresponding value for each stage indicated as follows.

$$\text{Power Consumption (Pmax) at a cache hit} >> \text{Power Consumption (Pmin) at the stall cycle (when accessing the system bus)} \quad (2)$$

As a recent technical trend, more computer systems are arranged so that the microprocessor unit 21 (see FIG. 6) operates on a different clock from the system bus and the operating clock of the microprocessor unit 21 is set as a high frequency for enhancing the performance. As is indicated in the inequality relation (2), the power consumption Pmax when a cache hit takes place is made maximum.

To cope with the unfavorable state, according to this embodiment, the virtual I/O control unit 27 shown in FIG. 6 is installed to extend the stall cycle indefinitely for reducing the power consumption into a minimum. In addition, no data is cached in the virtual I/O control unit 27.

If there is left no process to be executed by the system (for example, waiting for any key input), this state is referred to as an idle state. In this state, the virtual I/O control unit 27 is operated to access the cache memory for reading the data and the CPU puts the operating state into the stall cycle.

The virtual I/O address decoder 26 shown in FIG. 6 senses the access to the virtual I/O control unit 27 which executes a memory-mapped I/O to or from the system bus for sending a select signal/SELECT to the virtual I/O control unit 27.

In response to the select signal, the virtual I/O control unit 27 serves to extend the access cycle without generating an acknowledge signal until the below-indicated condition is met.

Figure 9:
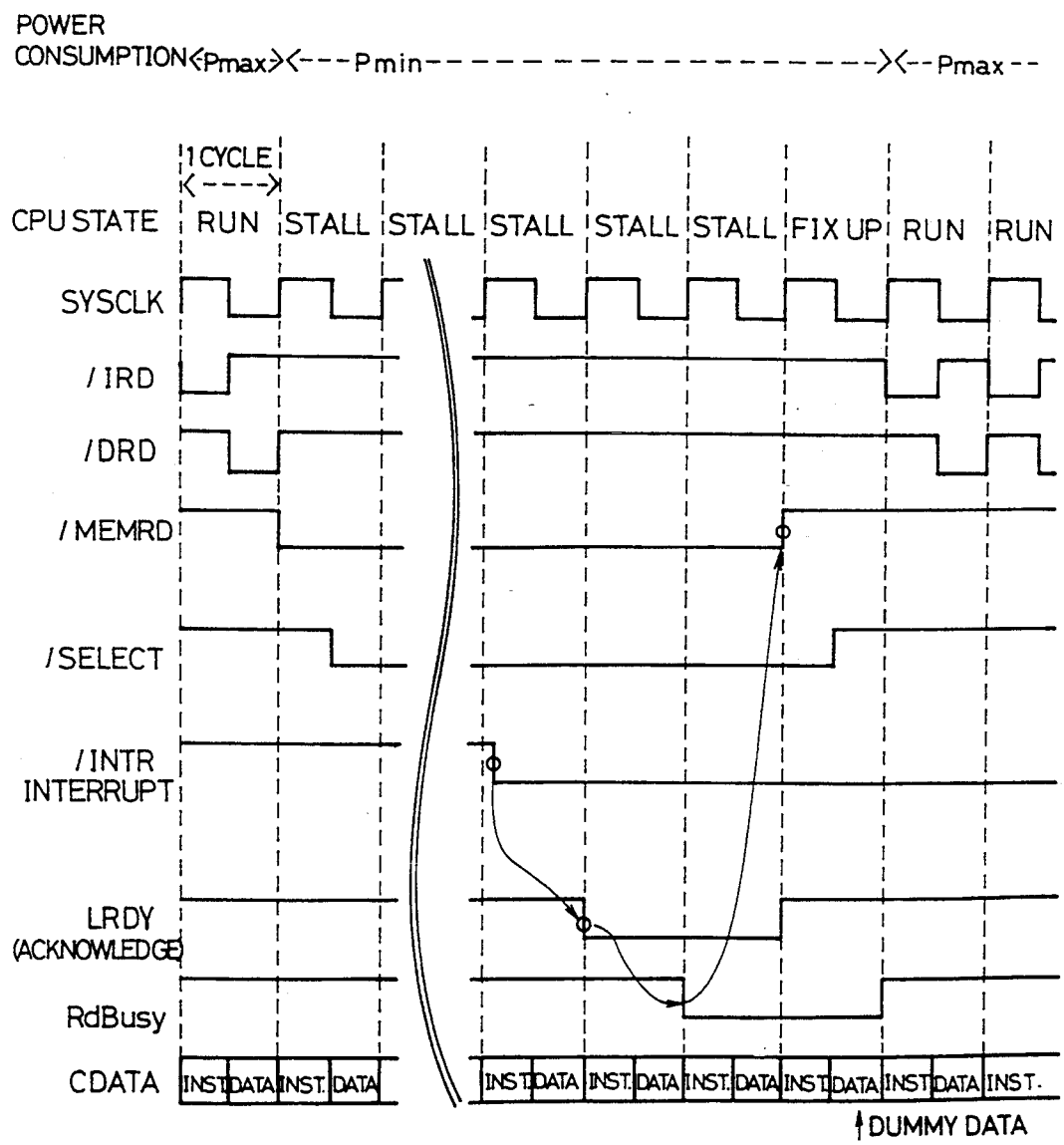
FIG. 9 is a chart showing a timing appearing when an access cycle for a virtual I/O control unit included in the apparatus shown in FIG. 6 is terminated by an interrupt.

If an interrupt from the peripheral device 24 takes place in the access cycle, the virtual I/O control unit 27 generates an acknowledge signal, sends it to the bus interface 213 shown in FIG. 6, and then terminates the stall cycle (see FIG. 9).

When the stall cycle is terminated and the CPU 211 enters into the run state again, the power consumption becomes maximum. The data read by the CPU 211 in the fix-up cycle does not allow any device to drive the system bus. Hence, the data is denoted as dummy data and is discarded.

As shown in FIG. 6, the interrupts from the peripheral devices 23 and 24 are ORed in the interrupt control unit 25. In the event that an interrupt from any peripheral device takes place, the interrupt signal (/INTR) is transmitted to the virtual I/O control unit 27 without fail.

For the peripheral device 24 having an acknowledge signal generated therein, the acknowledge signal is ORed with the acknowledge signal generated in the virtual I/O control unit 27 so that the resulting signal is sent to the bus interface 213. This results in eliminating the adverse effect of the peripheral devices like the peripheral device 24 having their own access cycle.

In accessing the virtual I/O control unit 27, the system bus is in use. For a device like the peripheral device 24 for issuing a request to obtain the system bus (bus request/BR) (for example, for the direct memory access (DMA)), however, the virtual I/O control unit 27 has to give the control of the system bus to such a device.

Figure 10:
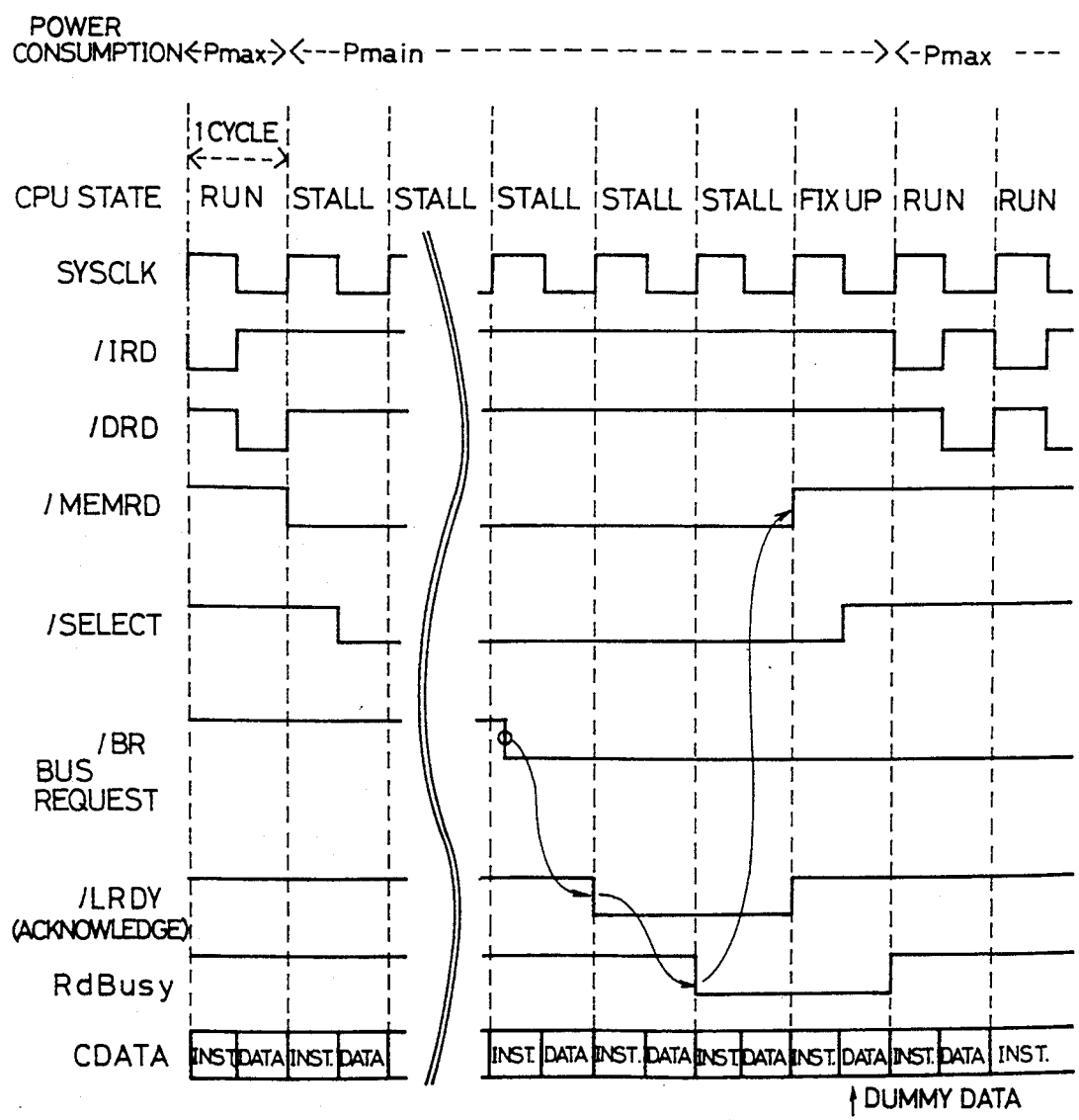
FIG. 10 is a chart showing a timing appearing when an access cycle for the virtual I/O control unit is terminated by a request for obtaining a system bus.

To cope with such a case, the virtual I/O control unit 27 monitors a request for obtaining a system bus (bus request), generates an acknowledge signal if requested, terminates the access to itself, and releases the bus (see FIG. 10).

FIG. 9 is a chart showing the timing appearing when the access cycle for the virtual I/O control unit 27 is terminated by an interrupt. FIG. 10 is a chart showing the timing appearing when the access cycle for the virtual I/O control unit 27 is terminated by the request for obtaining a system bus (bus request).

Figure 11:
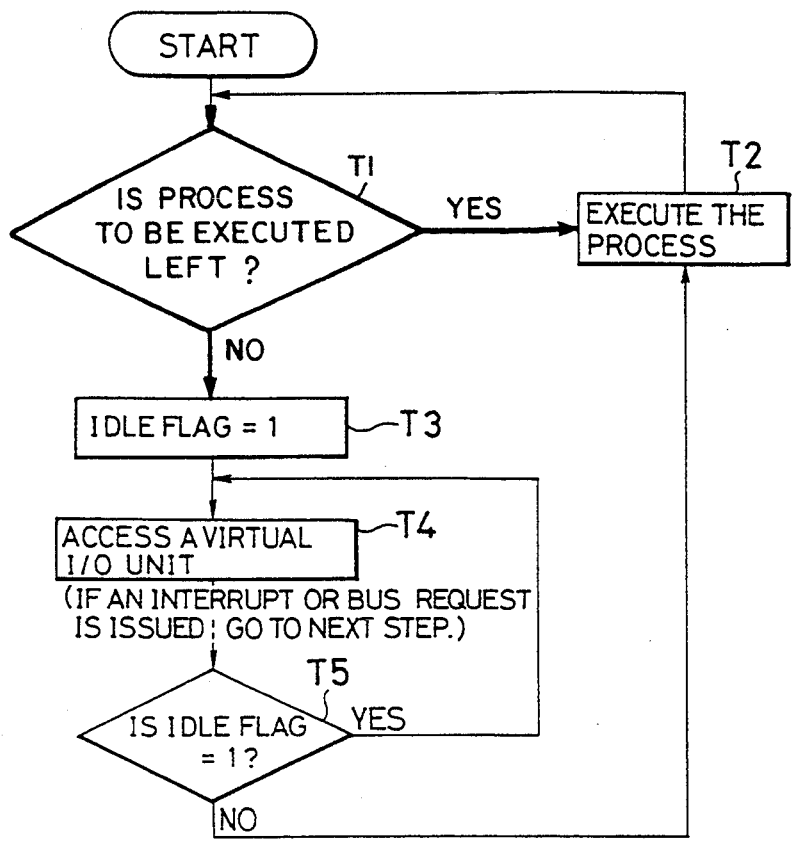
FIG. 11 is a flowchart for explaining an access to the virtual I/O control unit.

Next, the description will be oriented to the routine for accessing the virtual I/O control unit 27 as referring to the flowchart of FIG. 11.

At first, it is determined whether or not there is left any process to be executed (step T1). If yes, the process is executed (step T2). If no, a variable "idle flag" held in the main memory 22 shown in FIG. 6 is set to 1 (step T3). Then, the virtual I/O control unit 27 is accessed (step T4). This results in putting the CPU 211 into the stall cycle, thereby lowering the power consumption of the system.

If an interrupt or a bus request is issued from the peripheral device 24, the operation goes to a next step at which it is checked whether or not another interrupt is being processed (step T5). If no at the step T5, the stall cycle is terminated and it is checked whether or not the "idle flag" is 1. If yes at the step T6, the operation goes back Go the step T4. If no at the step T6, the operation goes back to the step T2 at which the process is executed.

If yes at the step T5, the operation goes to the steps T7 to T10 for processing an interrupt. It is checked whether or not the I/O to or from the peripheral devices 23 and 24 is terminated (step T7). If yes at the step T7, the "idle flag" is cleared as 0 (step T8). Then, the I/O interrupt is processed (step T9). Next, the interrupt processing is terminated and then operation goes back to the step T6.

If a bus request takes place at the step T5, the access to the virtual I/O control unit 27 is terminated and the operation goes to the step T6. If the "idle flag" is 1 at the step T6, it indicates that not an interrupt from the I/O unit but a bus request terminates the access to the virtual I/O control unit 27. In order to retry the access to the virtual I/O control unit, the control is given back to the step T4.

This is an algorithm configured on the virtual I/O control unit.

According to the present invention, while the virtual I/O control unit 27 is selected, the data on the system bus is dummy, that is, unnecessary. Hence, if the system bus suffers from so large load as needing to insert a bus driver, it is possible to avoid driving the bus driver, thereby reducing the power consumption by the amount consumed by the bus driver.

The virtual I/O control unit 27 occupies one physical address. This address is allocated to a non-cached logical address of the physical address space. This is because if cached, the access to the virtual I/O control unit 27 through the system bus is made impossible.

According to this embodiment, the physical address space is shown in Table 3.

TABLE 3

| Physical Address | Physical Address Map Way of Use Cycle | Control System | Bus Time-out |
| --- | --- | --- | --- |
| 0 x00000000-0x0FFFFFFF | Main memory area | Acknowledge | yes |
| 0 x18000000-0x1FAFFFFF | Virtual I/O Control Unit | Acknowledge | no |
| 0 x1FB00000-0x1FBDFFFF | Second I/O Area | Fixed Time | |
| 0 x1FBE0000-0x1FBEFFFF | First I/O Area | Acknowledge | yes |
| 0 x1FBF0000-0x1FBFFFFF | I/O inside of Bus Interface Chip | — | |
| 0 x1FC00000-0x1FFFFFFF | ROM Area | Fixed Time | |
| 0 x1FFFFFFF-0xFFFFFFFF | Non-use Area | | |

The I/O area is divided into a first region and a second region. The first region is allocated to the peripheral device 24 for controlling its cycle time with the acknowledge signal. The second region is allocated to the I/O unit having a fixed access time in which the access cycle is truncated after a certain time is passed, that is, each address space has its corresponding control system for a system bus.

In the space where the cycle time is controlled with an acknowledge signal, whether or not no return of an acknowledge signal for a fixed time is detected as a bus time-out error depends on each address space. For example, in the address space of the virtual I/O control unit 27, the bus time-out error is not detected.

In the present embodiment, the used CPU is R3000. Hence, the virtual I/O control unit 27 allocated to the physical address 0x1800000 is not cached but the system bus is accessed if it is accessed from the logical address 0xB8000000.

Any CPU may have a non-cached logic address space which is allowed to be allocated to an I/O unit. Hence, the virtual I/O control unit 27 can be allocated to the region.

In this embodiment, the virtual I/O control unit 27 is provided on the system bus. As such, it is detected whether or not there is a bus request from the peripheral device 23 or 24 until the access cycle for the virtual I/O control unit is terminated. To avoid using the system bus, the apparatus according to this embodiment may be implemented in the microprocessor unit shown in FIG. 6 so that the apparatus may be separated from the system bus. This results in making it unnecessary to monitor the bus request and drive the system bus when accessing the virtual I/O control unit, thereby possibly reducing the power consumption.

It is difficult to build the apparatus of this embodiment into the CPU 211 in light of the availability of the CPU 211. Ideally, therefore, the function of this embodiment should be built in the bus interface 213 when designing the bus interface 213. In the existing system, the virtual I/O control unit 27 is provided as a kind of an expanded peripheral board and is configured on the existing OS.

Table 4 lists the result of reducing the power consumption in the apparatus according to this embodiment.

TABLE 4

| Result of Reducing Power Consumption of CPU Board | | |
|---|---|---|
| | CPU Utilization 0% | CPU Using Rate 100% |
| Previous OS (1) | 26.5 W | 26.5 W |
| Present OS (2) | 19.0 W | 26.5 W |
| (2) - (1) | 7.5 W | 0.0 W |

In this embodiment, the CPU is R300A, the coprocessor of the CPU is FPU R3010A (floating-point operating chip), the cache memory is IDT7MB6049 (64 KB instruction cache plus 64 KB instruction cache) manufactured by IDT, Inc., the bus interface is LR3020 manufactured by LSI Logic, Inc., and the main memory has a volume of 16 MB. Further, a disk, an I/O unit(s) and an ethernet interface are also provided.

The CPU operates on a system clock of 25 MHz.

The used OS is RISCox V4.51 designed on the UNIX (AT&T) by MIPS Computer Systems, Inc. An operation of accessing the virtual I/O control unit is inserted into the part of the OS for waiting for an I/O.

In the time-sharing type OS on which a plurality of processes runs like UNIX, an idle state is prepared in a scheduling algorithm for managing execution of the processes in order that the apparatus according to this embodiment may be used in the idle state. For the part for the idle state, the loop of accessing the virtual I/O control unit 27 is inserted. It means that the number of parts to be changed is just one.

The system employed in the apparatus of this embodiment, as listed in Table 4, has an effect of reducing the power consumption by 7.5 w. The system further makes contribution to lowering the temperatures of the CPU, the FPU, and the cache memory.

Figure 12:
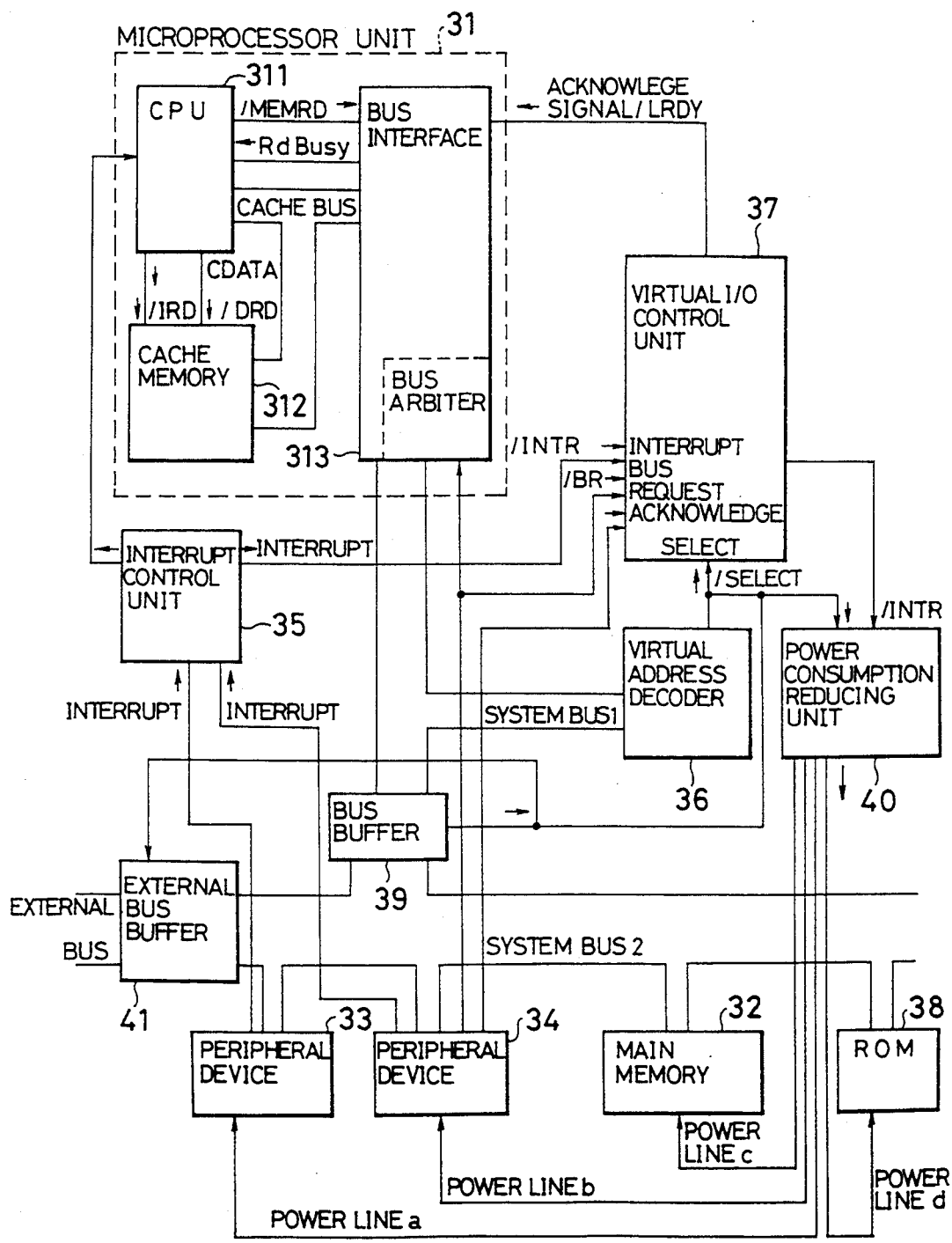
FIG. 12 is a block diagram showing a power control apparatus for a computer system according to a third embodiment of the present invention.

FIG. 12 is a block diagram showing an arrangement of a power control apparatus for a computer system according to a third embodiment of the present invention.

The power control apparatus for a computer system shown in FIG. 12 is arranged to have a microprocessor unit 31, a main memory 32, a fifth peripheral device 33, a sixth peripheral device 34 for issuing a request to obtain a system bus, an interrupt control unit 35, a virtual I/O address decoder 36, a virtual I/O control unit 37, a ROM 38, a system buffer 39, a power consumption reducing unit 40, and an external expansion bus driver 41.

The microprocessor unit 31 is made up of the microprocessor (CPU) 311, the cache memory 312, and the bus interface 313.

The bus interface 313 has a bus arbiter built therein. The bus arbiter operates to arbitrate a right of obtaining a system bus. The virtual I/O control unit 37 is installed with the I/O address decoder 36, which is assigned to part of an I/O unit of the system as a memory-mapped I/O unit.

Next, the description will be oriented to the operation of the power control apparatus for a computer system shown in FIG. 12.

Figure 13:
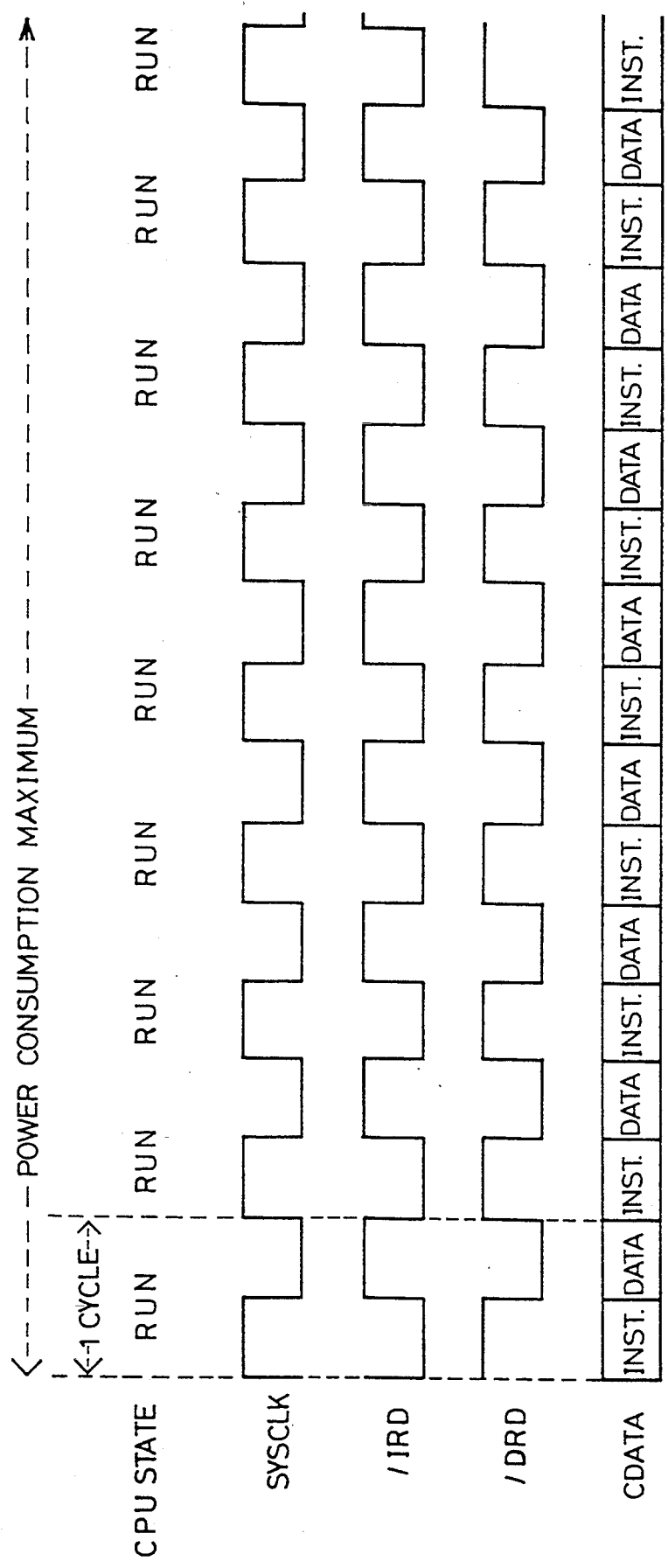
FIG. 13 is a flowchart for explaining an operation of a power control apparatus for a computer system shown in FIG. 12 if a cache is fully hit.
Figure 14:
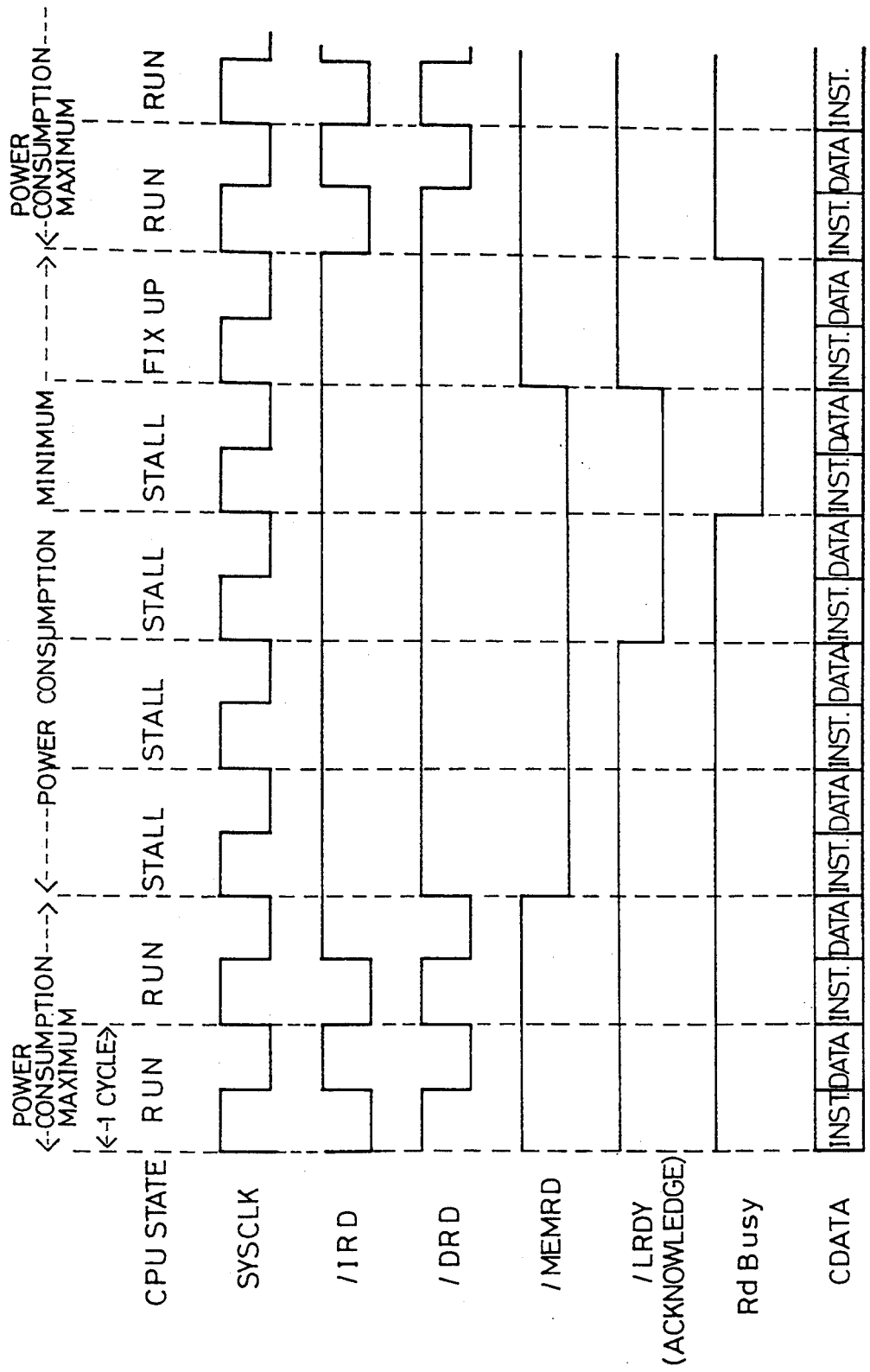
FIG. 14 is a flowchart for explaining an operation of a power control apparatus for a computer system shown in FIG. 12 when accessing a system bus if a miss hit on a cache for data takes place.

As shown in the timing charts of FIGS. 13 and 14, the microprocessor unit 31 operates in synchronous to the system clock SYSCLK of the CPU 311. The CPU 311 accesses the cache memory 312 for reading an instruction from the memory 312. The timing chart of FIG. 13 indicates that the cache is fully hit when executing the process, that is, the cache read strobe/IRD from the instruction cache is asserted in the first half of the access cycle so as to access the cache for an instruction. In the second half of the cycle, the cache read strobe/DRD is asserted for accessing the cache to read data. This makes it possible to access the cache data bus shown in FIG. 12 for reading the instruction or data alternately at each half cycle.

At this time, the microprocessor (CPU) 311 executes the process at the same cycle as the system clock SYSCLK. The power consumption of this apparatus, therefore, becomes maximum.

Next, the timing chart of FIG. 14 indicates the access to the system bus when a miss hit on the cache for reading data takes place.

If the miss hit on the cache for data takes place at the second cycle, /MEMRD (see FIG. 12) is asserted to the bus interface 313 at the third cycle, so that the CPU 311 starts accessing the system bus.

From the system bus, the acknowledge signal /LRDY is asserted to the bus interface after a certain length of time. This signal has a function of negating the RdBusy signal to the CPU 311 so that the access cycle for the system bus may be terminated. At the fix-up cycle, the CPU 311 operates to read the data read out of the system bus, and then, at the next cycle, restarts the run state.

Focusing on the power consumption, when the CPU 311 is in the run state, the power consumption is maximum. At the stall cycle, the access to the cache memory 312 at each cycle is stopped, resulting in that the power consumption in the cache memory 311 is small. The CPU 811 also stops executing an instruction, thereby the power consumption in the CPU 311 is made lower.

In the computer system arranged to have a cache memory with a large volume and a faster access cycle than the system bus, the power consumption has the corresponding value for each stage indicated as follows.

Power Consumption (Pmax) at a cache
hit>>Power Consumption (Pmin) at a stall cycle
(when accessing the system bus)       (3)

As a recent technical trend, more computer systems are arranged so that the microprocessor unit 31 (see FIG. 12) operates on a different clock from the system bus and the operating clock of the microprocessor unit 21 is set as a high frequency for enhancing the performance. As indicated in the inequality relation of (3), when a cache hit takes place the power consumption Pmax grows more and more.

To cope with the unfavorable state, according to this embodiment, the virtual I/O control unit 37 shown in FIG. 12 is installed to extend the stall cycle indefinitely for reducing the power consumption into a minimum.

If there is left no process to be executed by the system (for example, waiting for any key input), this state is referred to as an idle state. In this state, the CPU 311 operates the virtual I/O control unit 37 to access the cache memory for reading the data and puts itself into the stall cycle.

The virtual I/O address decoder 36 shown in FIG. 12 detects the access to the virtual I/O control unit 37 which takes an I/O to or from the system bus in a memory-mapped manner and sends the select signal/-SELECT to the virtual I/O control unit 37.

In response to the select signal, the virtual I/O control unit 37 serves to extend the access cycle without generating the acknowledge signal until the below-indicated condition is met.

Figure 15:
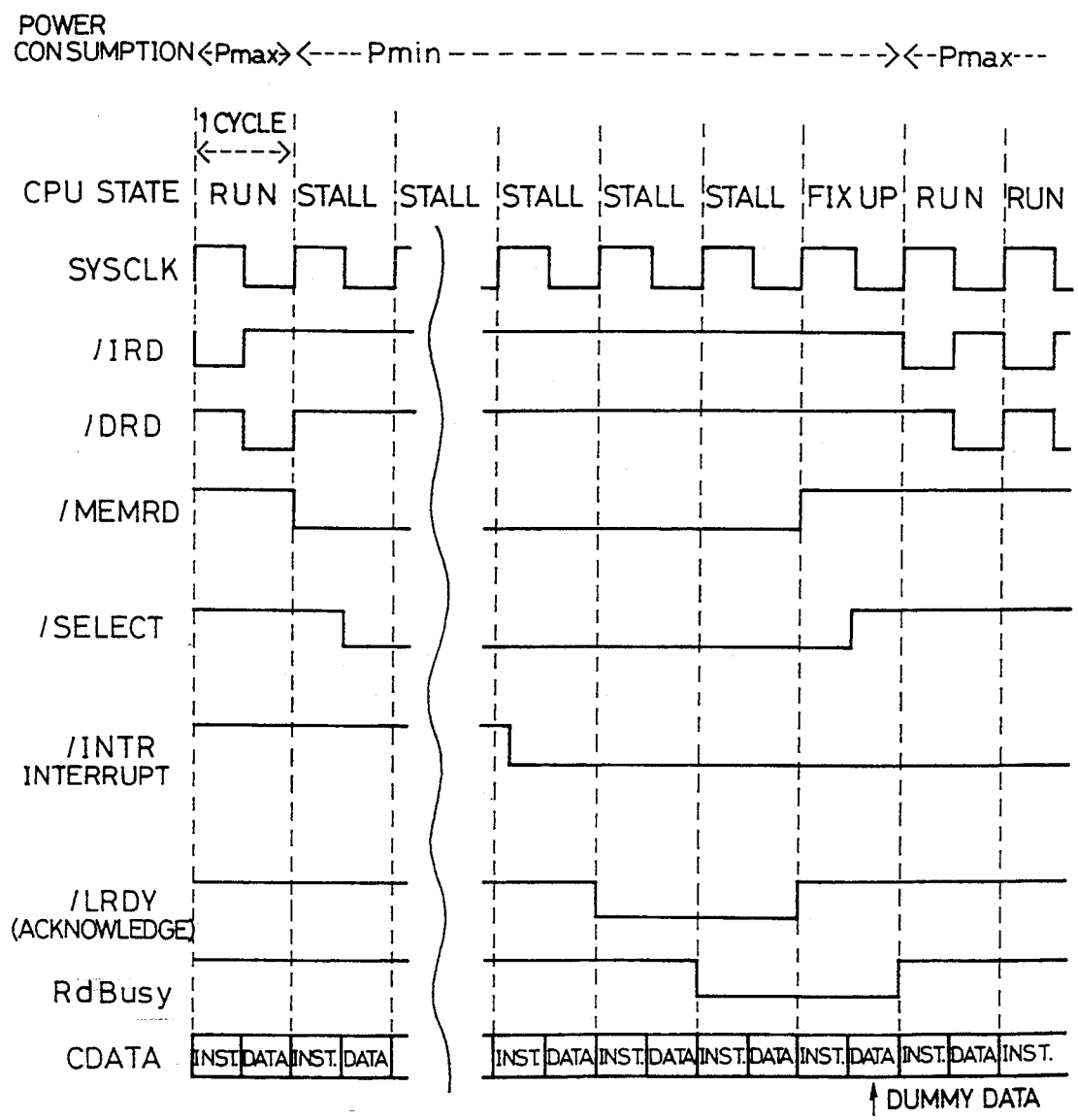
FIG. 15 is a chart showing a timing appearing when an access cycle for a virtual I/O control unit included in the apparatus shown in FIG. 12 is terminated by an interrupt.

If an interrupt from the peripheral device 34 takes place during the access cycle, the virtual I/O control unit 37 generates the acknowledge signal and sends it to the bus interface 313 shown in FIG. 12, so that the stall cycle may be terminated (see FIG. 15).

When the stall cycle is terminated and the CPU 311 is put into the run state, the power consumption becomes maximum. The data read by the CPU 311 at the fix-up cycle does not make contribution to driving any device on the system bus, that is, the data is dummy data and will be discarded.

In FIG. 12, the interrupts from the peripheral devices 33 and 34 are ORed in the interrupt control unit 35. If an interrupt takes place in any one of the peripheral devices, an interrupt signal/INTR is transmitted to the virtual I/O control unit 37 without fail.

For the peripheral device 34 having an acknowledge signal generated therein, the acknowledge signal is ORed with the acknowledge signal generated in the virtual I/O control unit 37 so that the resulting signal is sent to the bus interface 313. This results in eliminating the adverse effect of the peripheral devices like the peripheral device 34 having their own access cycles.

In accessing the virtual I/O control unit 37, the system bus is in use. For a device like the peripheral device 34 for issuing a request to obtain the system bus (bus request/BR) (for example, for the direct memory access (DMA)), however, the virtual I/O control unit 37 has to give the control of the system bus to such a device.

Figure 16:
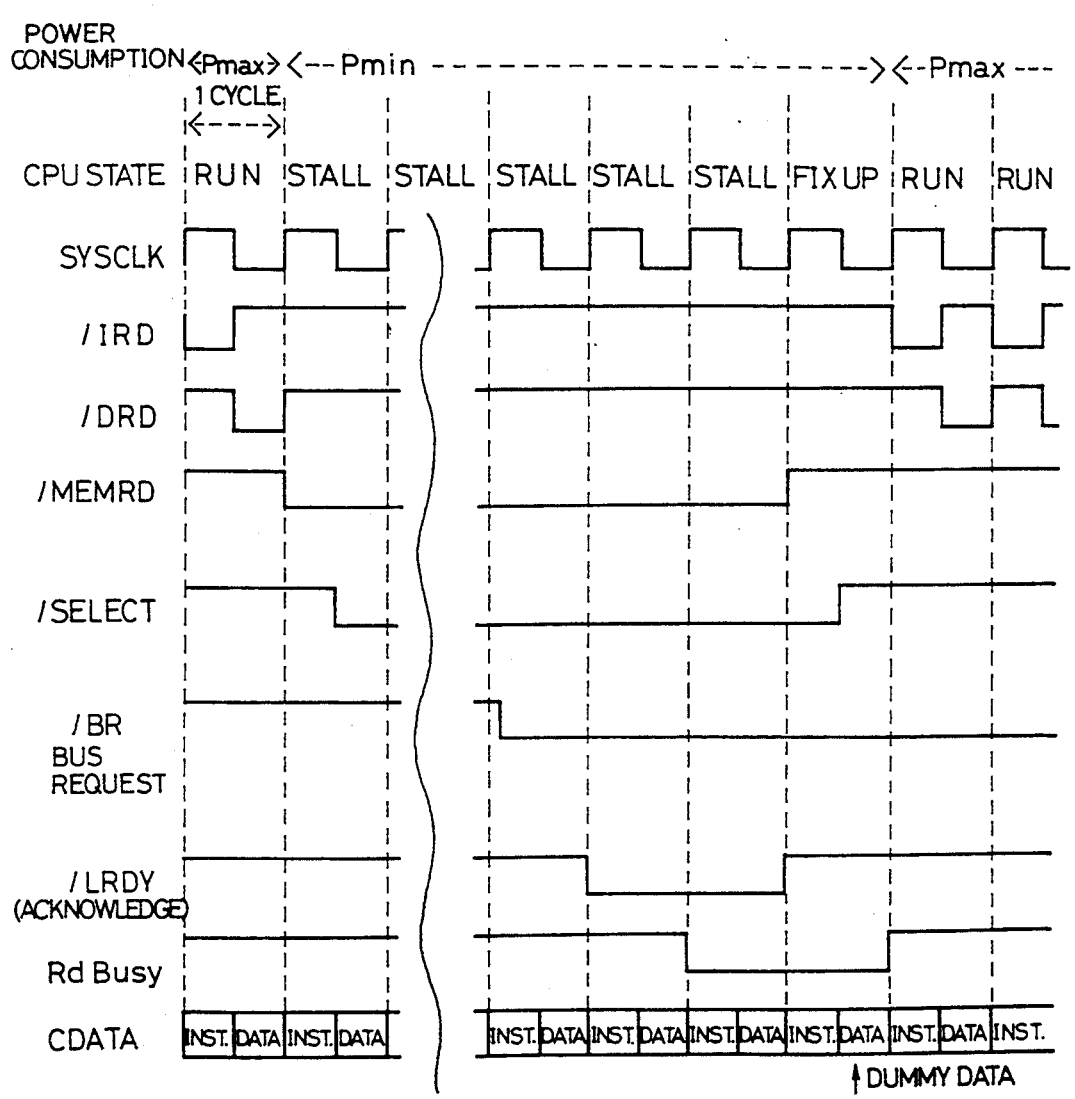
FIG. 16 is a chart showing a timing appearing when an access cycle to the virtual I/O control unit is terminated by a request for obtaining a system bus.

To cope with such a case, the virtual I/O control unit 37 monitors a request for obtaining a system bus (bus request), generates an acknowledge signal if requested, terminates the access to itself, and releases the bus (see FIG. 16).

FIG. 15 is a chart showing the timing appearing when the access cycle for the virtual I/O control unit 37 is terminated by an interrupt. FIG. 16 is a chart showing the timing appearing when the access cycle to the virtual I/O control unit 37 is terminated by the request for obtaining a system bus (bus request).

Figure 17:
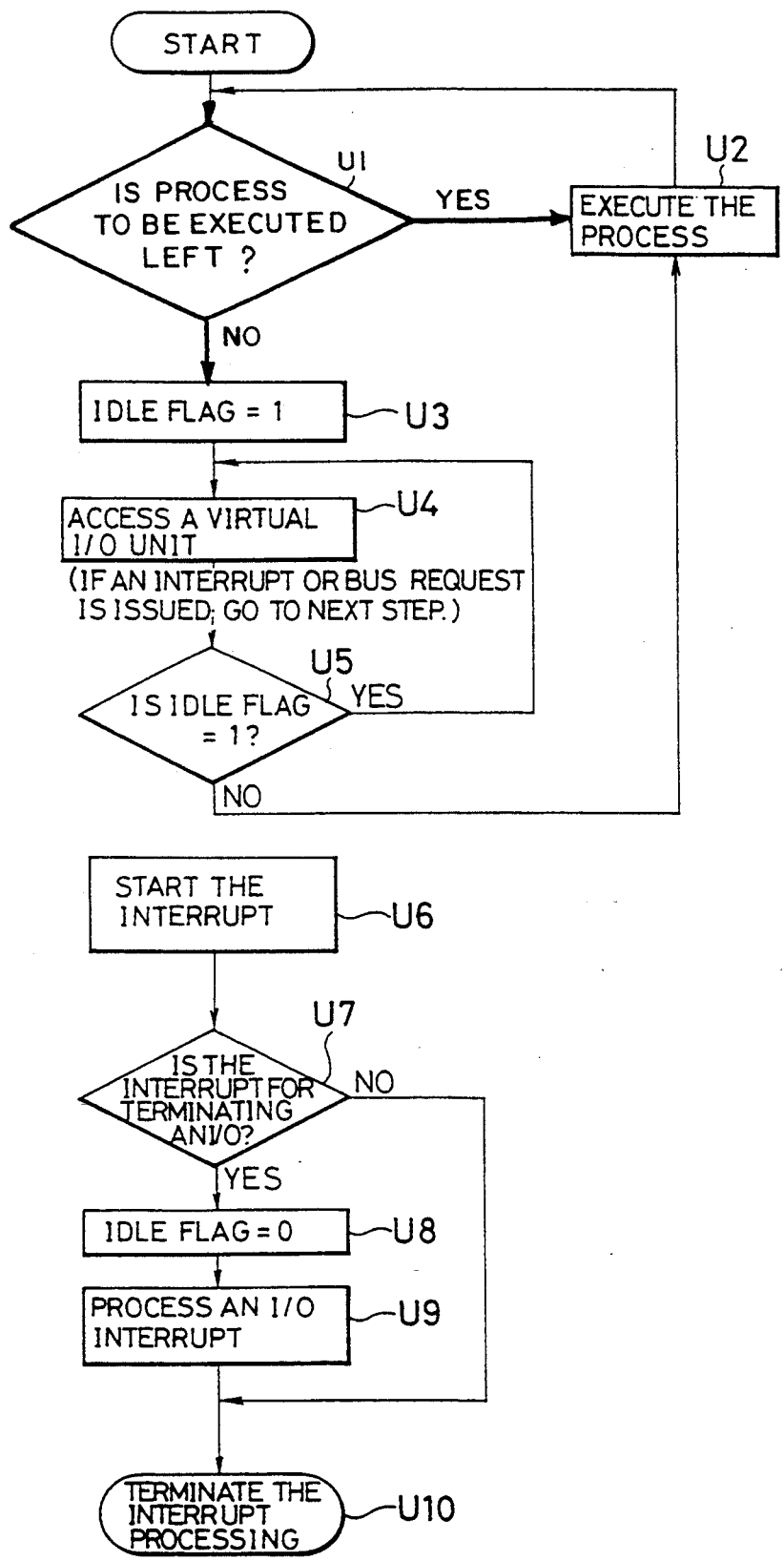
FIG. 17 is a flowchart for explaining an access to the virtual I/O control unit.

Next, the description will be oriented to the routine for accessing the virtual I/O control unit 27 as referring to the flowchart of FIG. 17.

At first, it is determined whether or not there is left any process to be executed (step U1). If yes, the process is executed (step U2). If no, a variable "idle flag" held in the main memory 32 shown in FIG. 12 is set to 1 (step U3). Then, the virtual I/O control unit 37 is accessed (step U4). This results in putting the CPU 311 into the stall cycle, thereby lowering the power consumption of the system.

If an interrupt or a bus request is issued from the peripheral device 34, the operation goes to a next step at which it is checked whether or not another interrupt is processed (step U5). Based on the checked result at the step U5, the operation goes to the interrupt-processing steps (U7 to U10) or the step U6.

When processing an interrupt, it is checked whether or not the I/O to and from the peripheral device is terminated (step T7). If yes at the step U7, the "idle flag" is cleared as 0 (step U8). Then, the I/O interrupt is processed (step U9). Next, the interrupt processing is terminated (step U10) and then the operation goes back to the step U5.

If, at the step U5, it is checked that the interrupt is not processed, it is checked whether or not an "idle flag" is 1 (step U6). If yes at the step U6, the operation goes back to the step U4. If no at the step U6, the operation goes back to the step U2.

If, at the step U5, a bus request takes place, the access to the virtual I/O control unit 37 is terminated and the operation goes to the step U5 shown in FIG. 17.

If the "idle flag" is 1 at the step U5, it indicates not the interrupt from the I/O device but the bus request causes the access to the virtual I/O control unit 37 to be terminated. In this case, for retrying the access to the virtual I/O control unit 37, the control is given to the step U4 shown in FIG. 17.

This is an algorithm configured on the virtual I/O control unit.

According to the present invention, while the virtual I/O control unit 37 is selected, the data on the system bus is dummy, that is, unnecessary. Hence, if the system bus suffers from so large load as needing to insert a bus driver, it is possible to avoid driving the bus driver, thereby reducing the power consumption by the amount consumed by the bus driver. The system bus buffer 39 shown in FIG. 12 is a buffer for driving the address and data bus of the system bus.

If /SELECT signal is asserted, the bus buffer 39 is disabled so that the output may be in the high-impedance state, This results in disabling to drive the bus, thereby lowering the power consumption by the amount consumed by the bus driver Likewise, while the /SELECT signal is asserted, the external expansion bus buffer 41 connected to the system bus is also disabled for reducing the power consumption by the amount consumed by the buffer 41.

While the /SELECT signal is asserted, any device on the system bus, if it may be transferred to a low power consumption mode, is allowed to be controlled by only the /SELECT signal in a manner that the supply voltages (see the power lines (a) to (d) of FIG. 12) fed from the power consumption reducing unit 40 are individually controlled to the low power consumption state.

For example, the Table 5 lists the relation between the power lines (a) to (d) and the /SELECT signal.

TABLE 5

| Relation between the supply voltage on the power lines and the /SELECT signal | | |
|---|---|---|
| Object Device | SELECT = H | /SELECT = L |
| Power Line (11) Peripheral Device (3) | +5V | +3.3V |
| Power Line (12) Peripheral Device (4) | +5V | +5V |
| Power Line (13) Main Memory (5) | +5V | +3.3V |
| Power Line (14) ROM (8) | +5V | 0V |

That is, while the virtual I/O unit is selected (/SELECT=L), each device enables to lower its power consumption as much as possible. The peripheral device 33 may be lowered to 3.3 V, while the low margin of the peripheral device 34 is limited to 5 V. The main memory 32 may be lowered to 3.3 V for holding the content thereof. The ROM 38 may be lowered to 0 V. That is, the power may be set according to each device.

The power feed to the peripheral device 33 or 34, the ROM 38, or the main memory 32 may be controlled on the software.

According to this embodiment, the /SELECT signal is prepared for indicating the low power consumption mode, as a consequence, while the /SELECT signal is asserted, it is set to be a period for managing the power.

Figure 18:
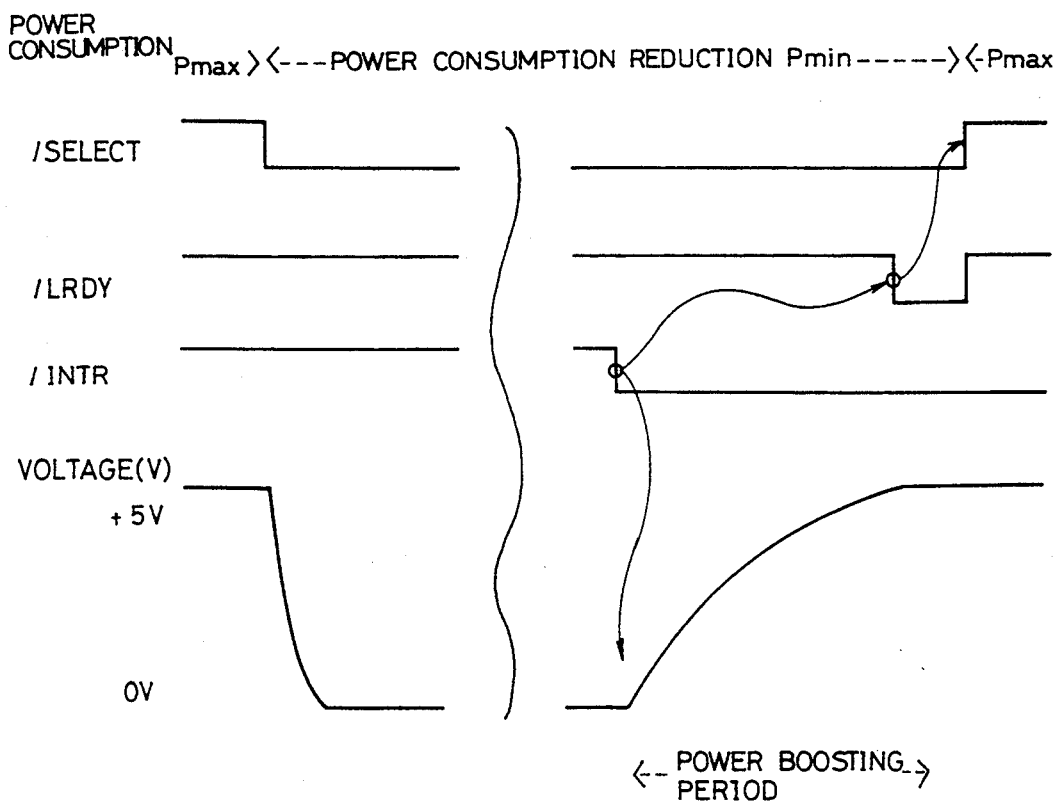
FIG. 18 is a timing chart for explaining an operation of the virtual I/O control unit corresponding to the delay resulting from voltage boost.

As shown in FIG. 18, assuming that each power line temporarily enters into a power-down state, to terminate the access cycle for the virtual I/O control unit 37 by an interrupt from the I/O device, if a certain period of time (for example, T seconds) is required to boost the power from the low state to the high state, the acknowledge signal is asserted T seconds later for terminating the access to the virtual I/O control unit 37 T seconds later than when the I/O interrupt takes place.

The virtual I/O control unit 37 occupies one physical address. This address is allocated to a non-cached logical address of the physical address space. This is because if cached, the access to the virtual I/O control unit 37 through the system bus is made impossible.

According to this embodiment, the physical address space is shown in Table 6.

TABLE 6

| Physical Address | Physical Address Map | | |
|---|---|---|---|
| | Way of Use | Cycle Control System | Bus-Timeout |
| 0 x00000000-0x0FFFFFFF | Main memory area | Acknowledge | yes |
| 0 x18000000-0x1FAFFFFF | Virtual I/O Control Unit | Acknowledge | no |
| 0 x1FB00000-0x1FBDFFFF | Second I/O Area | Fixed Time | |
| 0 x1FBE0000-0x1FBEFFFF | First I/O Area | Acknowledge | yes |
| 0 x1FBF0000-0x1FBFFFFF | I/O inside of Bus Interface Chip | — | |
| 0 x1FC00000-0x1FFFFFFF | ROM Area | Fixed Time | |
| 0 x1FFFFFFF-0xFFFFFFFF | Non-use Area | | |

The I/O area is divided into a first region and a second region. The first region is allocated to the peripheral device for controlling its cycle time with the acknowledge signal. The second region is allocated to the I/O unit having a fixed access time in which the access cycle is truncated after a certain time is passed, that is, each address space has its corresponding control system for a system bus. In the space where the cycle time is controlled with an acknowledge signal, whether or not no return of an acknowledge signal for a fixed time is detected as a bus time-out error depends on each address space. For example, in the address space of the virtual I/O control unit 27, the bus time-out error is not detected, because it is obviously unfavorable.

In the present embodiment, the used CPU is R3000. Hence, no data is cached in the virtual I/O control unit 37 allocated to the physical address 0x1800000, but the system bus is accessed if it is accessed from the logical address 0xB8000000.

Any CPU may has a non-cached logic address space which is allowed to be allocated to an I/O unit. Hence, the virtual I/O control unit 37 can be allocated to the region.

In this embodiment, the virtual I/O control unit 37 is provided on the system bus. As such, it is detected whether or not there is a bus request from the peripheral device 33 or 34 until the access cycle for the virtual I/O control unit 37 is terminated. In order to avoid using the system bus, the apparatus according to this embodiment may be implemented in the microprocessor unit 31 shown in FIG. 12 so that the apparatus may be separated from the system bus, it results in making it unnecessary to monitor the bus request.

It is difficult to build the apparatus of this embodiment into the CPU 311 in light of the availability of the CPU 311. Ideally, therefore, the function of this embodiment should be built in the bus interface 313 when designing the bus interface 313. In the existing system, the virtual I/O control unit 37 is provided as a kind of an expanded peripheral board and is configured on the existing OS.

Table 7 lists the result of reducing the power consumption in the apparatus according to this embodiment.

TABLE 7

| Result of Reducing Power Consumption of CPU Board | | |
|---|---|---|
| | CPU Utilization 0% | CPU Using Rate 100% |
| Previous OS (1) | 26.5 W | 26.5 W |
| Present OS (2) | 19.0 W | 26.5 W |
| (2) - (1) | 7.5 W | 0.0 W |

In this embodiment, the CPU is R300A, the coprocessor of the CPU is FPU R3010A (floating-point operating chip), the cache memory is IDT7MB6049 (64 KB instruction cache plus 64 KB instruction cache) manufactured by IDT, Inc., the bus interface is LR3020 manufactured by LSI Logic, Inc., and the main memory has a volume of 16 MB. Further, a disk, an I/O unit(s) and an ethernet interface are also provided.

The CPU operates on a system clock of 25 MHz.

To check the effect of reducing the power consumption of the microprocessor unit 31 through the effect of this embodiment without operating the power consumption reducing unit 40 shown in FIG. 12, the foregoing values are measured.

The used OS is RISCox V4.51 designed on the UNIX (AT&T) by MIPS Computer Systems, Inc. An operation of accessing the virtual I/O control unit is inserted into the part of the OS for waiting for an I/O.

In the time-sharing type OS on which a plurality of processes runs like UNIX, an idle state is prepared in a scheduling algorithm for managing execution of the processes in order that the apparatus according to this embodiment may be used in the idle state. For the part for the idle state, the loop of accessing the virtual I/O control unit 37 is inserted, that is, the number of parts to be changed is just one.

The system employed in the apparatus of this embodiment, as listed in Table 6, has an effect of reducing the power consumption by 7.5 w. The system further makes contribution to lowering the temperatures of the CPU, the FPU, and the cache memory.

According to the first to the third embodiments, the utilization of the CPU indicates a proportion of time when the CPU is not in the idle state while the system is in operation.

The present system enables to reduce the power consumption in the idle state. As such, in principle, the relation between the effect of reducing the power consumption and the CPU utilization is linear.

That is, the power consumption is as follows.

Power Consumption at CPU utilization is 0% = Wmin

Power Consumption at CPU utilization is 100% = Wmax

The following relation is established

Power consumption = Wmin + (Wmax − Wmin) × CPU utilization (%)/100

Hence, as the CPU utilization is lower, the effect of reducing the power consumption is made higher.

In the UNIX circumstance, the CPU often waits for an interrupt from an I/O unit, thereby the CPU utilization often approaches 0%. In this state, the power consumption is substantially equal to Wmin, that is, the apparatus of this embodiment is very effective.

If the apparatus of this embodiment applies to a battery-driven computer system, the computer system can be driven by a battery for a longer time by the reduced amount of the power consumption.

In the idle state, the switching ratio of the cache memory bus to the system bus is made lower. Hence, it is possible to suppress the unnecessary electromagnetic wave occurring in the circuit. Further, it is unnecessary to change the circuit. A requirement is to change the software in a manner to access the ROM in the idle state.

As the current technical trend of increasing an operating speed of the CPU and a volume and a speed of the cache memory, therefore, the present invention is made more effective.

Many widely different embodiments of the present invention may be constructed without departing from the spirit and scope of the present invention. It should be understood that the present invention is not limited to the specific embodiments described in the specification, except as defined in the appended claims.

What is claimed is:

1. A power control apparatus having a plurality of external devices and used for a computer system and to reduce the power consumption in an idle state, the apparatus comprising:

processing means for receiving a signal from at least one of said plurality of external devices and for outputting an instruction according to said received signal;

storage means connected to said processing means for temporarily storing information and for accessing to said processing means according to said instruction output from said processing means;

interface means connected to both said processing means and said storage means for controlling an interface between said processing means and said storage means; and adjusting means connected to said interface means for adjusting the time proportion of an access cycle for said storage means to an access cycle for a non-storage means and for adjusting the time period during which the processor should be idle, wherein each of said plurality of external devices includes an input/output device, a main memory, a read-only memory, and at least two peripheral devices, said adjusting means including an acknowledge generating circuit connected to said interface means for generating an acknowledge signal during a predetermined time period so as to terminate an access cycle of one of said peripheral devices.

2. A power control apparatus according to claim 1, wherein said adjusting means is so arranged that all of said adjusting processes are executed in an idle state of awaiting an interrupt for terminating a process from another one of said plurality of external devices.

3. A power control apparatus according to claim 2, wherein said adjusting means further includes an address decoder connected to said acknowledge generating circuit for outputting a select signal to said read-only memory, and said acknowledge generating circuit generates an acknowledge signal after a passage of selecting time of said read-only memory so that an access cycle of said read-only memory is terminated according to said acknowledge signal generated.

4. A power control apparatus according to claim 2, wherein said adjusting means includes a virtual input/output control means connected to said interface means for extending a stall cycle indefinitely so as to reduce a power consumption to a minimum.

5. A power control apparatus according to claim 4, wherein said virtual input/output control means further accesses said storage means for reading data so that said processing means sets an operating state into said stall cycle in said idle state.

6. A power control apparatus according to claim 5, wherein said adjusting means further includes a virtual input/output address decoder connected to said virtual input/output control means for sensing an access to said virtual input/output control means so that said virtual input/output control means sends a select signal to said virtual input/output control means.

7. A power control apparatus according to claim 6, wherein said virtual input/output control means extends an access cycle without generating an acknowledge signal until an interrupt from said one of peripheral device takes place in said access cycle, generates an acknowledge signal, and sends said generated acknowledge signal to said interface means so as to terminate said stall cycle.

8. A power control apparatus according to claim 7, wherein said adjusting means further includes an interrupt control means connected to both said processing means and said virtual input/output control means for executing a logic OR of interrupts output from said peripheral devices so as to output an interrupt signal to said virtual input/output control means.

9. A power control apparatus according to claim 8, wherein said adjusting means includes a bus buffer connected to both said interface means and said virtual input/output control means and disabled when a signal is asserted thereto from said virtual address decoder so as to lower a power consumption.

10. A power control apparatus according to claim 8, wherein said adjusting means further includes an external bus buffer connected to said virtual input/output control means and disabled when a signal is asserted thereto from said virtual address decoder so as to lower a power consumption.

11. A power control apparatus according to claim 8, wherein said power control apparatus further includes a first system bus for interconnecting said interface means with said bus buffer and said virtual address decoder, a second system bus for interconnecting said bus buffer with said external bus buffer, said peripheral devices, said main memory and said read-only memory.

12. A power control apparatus according to claim 8, wherein said adjusting means further includes a power consumption reducing means connected to said virtual input/output control means for supplying voltages to any devices located on said first system bus and said second system bus with a low power consumption state.

13. A power control apparatus according to claim 1, wherein said processing means is a microprocessor, said storage means is a cache memory, said interface means is a bus interface.

* * * * *